United States Patent
Jeong

(10) Patent No.: US 9,767,213 B2
(45) Date of Patent: Sep. 19, 2017

(54) METHOD AND SYSTEM FOR PROVIDING WEB PAGE USING DYNAMIC PAGE PARTITIONING

(71) Applicant: NHN Corporation, Seongnam-si (KR)

(72) Inventor: Minhyeok Jeong, Seongnam-si (KR)

(73) Assignee: NAVER CORPORATION, Seongnam-si (KR)

(*) Notice: Subject to any disclaimer, the term of this patent is extended or adjusted under 35 U.S.C. 154(b) by 357 days.

(21) Appl. No.: 13/886,699

(22) Filed: May 3, 2013

(65) Prior Publication Data

US 2014/0143653 A1 May 22, 2014

(30) Foreign Application Priority Data

Nov. 19, 2012 (KR) .................. 10-2012-0130732

(51) Int. Cl.
*G06F 17/22* (2006.01)
*G06F 17/30* (2006.01)

(52) U.S. Cl.
CPC .............. *G06F 17/30905* (2013.01)

(58) Field of Classification Search
CPC ..................................................... G06F 17/22
See application file for complete search history.

(56) References Cited

U.S. PATENT DOCUMENTS 5,903,902 A * 5/1999 Orr .................. G06F 17/211
715/202
5,987,171 A * 11/1999 Wang .............. G06K 9/00442
382/173
6,633,303 B2 * 10/2003 Nakajima ........ G06K 9/00442
345/629
7,350,142 B2 * 3/2008 Kraft ................. G06F 17/212
715/210
7,392,473 B2 * 6/2008 Meunier ........... G06K 9/00469
715/247
7,428,700 B2 * 9/2008 Wen .................. G06F 17/218
707/E17.093

(Continued)

FOREIGN PATENT DOCUMENTS

| JP | 2006-195675 | 7/2006 |
| JP | 2010-134934 | 6/2010 |

(Continued)

OTHER PUBLICATIONS

Japanese Office Action issued in Japanese Patent App. No. 2013-060092, issued May 7, 2014.

(Continued)

*Primary Examiner* — Scott Baderman
*Assistant Examiner* — Sookil Lee
(74) *Attorney, Agent, or Firm* — Greer Burns & Crain, Ltd.

(57) ABSTRACT

A method and a system for providing a web page using dynamic page partitioning is provided. The method includes requesting the web page from a server, receiving the web page including content configured by a plurality of blocks from the server, partitioning the web page into the plurality of pages by split inserting the plurality of blocks into a plurality of pages based on a screen size of a display screen and a display size of the content in the plurality of blocks being displayed on the display screen. A page from among a plurality of pages is thus displayed on the display screen.

13 Claims, 26 Drawing Sheets

(56) References Cited

U.S. PATENT DOCUMENTS

| | | | | |
|---|---|---|---|---|
| 7,433,548 | B2* | 10/2008 | Goodwin | G06K 9/00442 382/173 |
| 7,853,871 | B2* | 12/2010 | Simons | G06F 17/30905 715/238 |
| 8,023,738 | B1* | 9/2011 | Goodwin | G06K 9/00469 382/175 |
| 8,091,021 | B2* | 1/2012 | Bargeron | G06F 17/248 715/243 |
| 8,176,414 | B1* | 5/2012 | Baluja | G06F 17/30905 715/234 |
| 8,208,737 | B1* | 6/2012 | Ie | G06K 9/00469 382/175 |
| 8,499,236 | B1* | 7/2013 | Keljo | G09G 5/34 715/243 |
| 8,612,850 | B2* | 12/2013 | Huang et al. | 715/243 |
| 9,317,622 | B1* | 4/2016 | Zuromski | G06F 17/30905 |
| 2003/0014445 | A1* | 1/2003 | Formanek | G06F 17/211 715/247 |
| 2004/0075672 | A1* | 4/2004 | Vale | G09G 5/00 345/660 |
| 2004/0103371 | A1* | 5/2004 | Chen et al. | 715/513 |
| 2005/0165791 | A1* | 7/2005 | Chen | G06F 17/30905 |
| 2005/0195221 | A1* | 9/2005 | Berger et al. | 345/660 |
| 2006/0026507 | A1* | 2/2006 | Balinsky | G06T 11/60 715/247 |
| 2006/0150093 | A1* | 7/2006 | Chen | G06F 17/217 715/251 |
| 2006/0184638 | A1* | 8/2006 | Chua | G06F 17/30905 709/217 |
| 2007/0073650 | A1* | 3/2007 | Lueck | G06F 17/30905 |
| 2008/0010335 | A1* | 1/2008 | Wyler | G06F 17/30905 709/201 |
| 2008/0016462 | A1* | 1/2008 | Wyler et al. | 715/810 |
| 2008/0040659 | A1* | 2/2008 | Doyle | G06F 17/30902 715/236 |
| 2008/0267535 | A1* | 10/2008 | Goodwin | G06K 9/00442 382/305 |
| 2008/0282173 | A1* | 11/2008 | Kim et al. | 715/747 |
| 2009/0024916 | A1* | 1/2009 | Burckart et al. | 715/241 |
| 2010/0146413 | A1* | 6/2010 | Yu | 715/760 |
| 2011/0126113 | A1* | 5/2011 | Sharma et al. | 715/738 |
| 2012/0192063 | A1* | 7/2012 | Koren | G06F 17/30905 715/252 |
| 2012/0240063 | A1* | 9/2012 | Andrade et al. | 715/760 |
| 2012/0278704 | A1* | 11/2012 | Ying et al. | 715/243 |
| 2012/0290911 | A1* | 11/2012 | Zhao | 715/205 |
| 2012/0324341 | A1* | 12/2012 | Dejean | G06F 17/211 715/243 |
| 2013/0124953 | A1* | 5/2013 | Fan | G06F 17/212 715/202 |
| 2013/0174017 | A1* | 7/2013 | Richardson | G06F 17/21 715/234 |
| 2013/0191734 | A1* | 7/2013 | Ayers | G06F 17/212 715/252 |
| 2013/0227398 | A1* | 8/2013 | Bolstad | 715/236 |
| 2013/0275854 | A1* | 10/2013 | Lim | G06F 17/2247 715/234 |
| 2013/0283148 | A1* | 10/2013 | Lim | G06F 17/2247 715/234 |
| 2013/0305144 | A1* | 11/2013 | Jackson et al. | 715/246 |
| 2014/0101136 | A1* | 4/2014 | Mizuno et al. | 707/722 |
| 2014/0115432 | A1* | 4/2014 | Turner | G06F 17/217 715/205 |

FOREIGN PATENT DOCUMENTS

| | | |
|---|---|---|
| KR | 10-0844071 | 6/2008 |
| KR | 10-2010-0065744 | 6/2010 |
| WO | WO 2010/004968 A1 | 1/2010 |

OTHER PUBLICATIONS

Korean Office Action issued in Korean Patent App. No. 10-2012-0130732, issued Dec. 30, 2013.

NHN Corporation, Sep. 24, 2012, Republic of Korea, http://naver_diary.blog.me/150148051940.

NHN Corporation, Sep. 26, 2012, Republic of Korea, http://blog.naver.com/dic_master/90153114070.

* cited by examiner

Christmas
[Christmas, X-mas]

Type    Ritual
Date    December 25
           (Gregorian calendar)
Age    Modern
Characteristic    Christian event
Alternative name    Sungtanjeol ( 1 )  o  o  — 410

Christmas
[Christmas, X-mas]

Type    Ritual
Date    December 25
        (Gregorian calendar)
Age     Modern
Characteristic   Christian event
Alternative name    Sungtanjeol Definition Christian memorial day for celebrating birth of Jesus Christ

① ○     ---510

METHOD AND SYSTEM FOR PROVIDING WEB PAGE USING DYNAMIC PAGE PARTITIONING

CROSS-REFERENCE TO RELATED APPLICATION

This application claims priority from and the benefit of Korean Patent Application No. 10-2012-0130732, filed on Nov. 19, 2012, which is hereby incorporated by reference for all purposes as if fully set forth herein.

BACKGROUND OF THE INVENTION

Field of the Invention

Exemplary embodiments of the present invention relate to a method and system for providing a web page using dynamic page partitioning.

Discussion of the Background

A conventional mobile terminal has an issue of readability due to a limited screen size when a general web page is displayed. A dedicated mobile web page has usually been used in order to solve the issue of readability. However, a mobile terminal continues to face obstacles when providing a page suitable for a screen size of the mobile terminal.

Accordingly, there is a need for providing a web page efficiently for various types of mobile terminals.

SUMMARY OF THE INVENTION

Exemplary embodiments of the present invention provide a method and a system for providing a web page that overcomes restrictions of a set screen size. Exemplary embodiments of the present invention also enhance readability of a web page, and enhance usability through performing dynamic partitioning on a web page based on a type of mobile terminal or a screen size.

Additional features of the invention will be set forth in the description which follows, and in part will be apparent from the description, or may be learned by practice of the invention.

Exemplary embodiments of the present invention provide a method for displaying a web page using a display screen, the method including receiving a web page comprising content configured by a plurality of blocks from a server, partitioning the web page into a plurality of pages by split inserting the plurality of blocks into the plurality of pages based on a screen size of the display screen and a display size of the content in the plurality of blocks to be displayed on the display screen, and displaying a page of the plurality of pages on the display screen.

Exemplary embodiments of the present invention also provide a method for displaying a web page using a display screen, the method comprising, providing information on a screen size of a display screen to the server, receiving a plurality of pages partitioned from a single web page from the server and displaying a page of the plurality of pages partitioned on the display screen, wherein content included in the single web page is configured by a plurality of blocks, and wherein the plurality of blocks is split inserted into the plurality of pages based on the screen size and a display size of the content in the plurality of blocks displayed on the display screen.

Exemplary embodiments of the present invention also provide A method for displaying a web page using a display screen, the method including executing content of a web page by partitioning the content into a plurality of blocks, receiving a request for the web page, and providing the web page comprising the content in response to a request for the web page, wherein the web page is partitioned into the plurality of pages by the plurality of blocks being split inserted into the plurality of pages based on a screen size of the display screen and a display size of the content in the plurality of blocks to be displayed on the display screen.

Exemplary embodiments of the present invention also provide a method for displaying a web page using a display screen, the method including executing content of the web page by partitioning the content into a plurality of blocks, receiving a request for the web page, receiving information about a screen size of a display screen, partitioning the web page into a plurality of pages by split inserting the plurality of blocks into the plurality of pages based on the screen size and a display size of the content in the plurality of blocks to be displayed on the display screen, and providing the partitioned plurality of pages in response to the request received from the web page.

Exemplary embodiments of the present invention also provide a non-transitory computer-readable recording medium storing a program to implement the method, the method including, receiving a web page comprising content configured by a plurality of blocks from a server, partitioning the web page into a plurality of pages by split inserting the plurality of blocks into the plurality of pages based on a screen size of the display screen and a display size of the content in the plurality of blocks to be displayed on the display screen, and displaying a page of the plurality of pages on the display screen.

Exemplary embodiments of the present invention also provide a system for displaying a web page using a display screen, the system including, a content executing unit to execute content in a web page by partitioning the content into a plurality of blocks, a web page request receiving unit to receive a request and a web page providing unit to provide the web page comprising the content in response to the request for the web page, wherein the web page is partitioned into a plurality of pages through the plurality of blocks being split inserted into the plurality of pages based on a screen size of the display and a display size of the content in the plurality of blocks to be displayed on the display screen.

Exemplary embodiments of the present invention also provide a system for displaying a web page using a display screen, the system including, a content executing unit to execute content in the web page by partitioning the content into a plurality of blocks, a web page request receiving unit to receive a request, a screen size receiving unit to receive information about a screen size of a display screen, a page partitioning unit to partition the web page into the plurality of pages by split inserting the plurality of blocks into the plurality of pages based on the screen size and the display size of the content in the plurality of blocks being displayed on the display screen. It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 4, FIG. 5, and FIG. 6 are diagrams illustrating examples of screens displayed by automatically partitioning a web page based on a screen size of a mobile terminal according to exemplary embodiments of the present invention.

DETAILED DESCRIPTION OF THE ILLUSTRATED EMBODIMENTS

Figure 1:
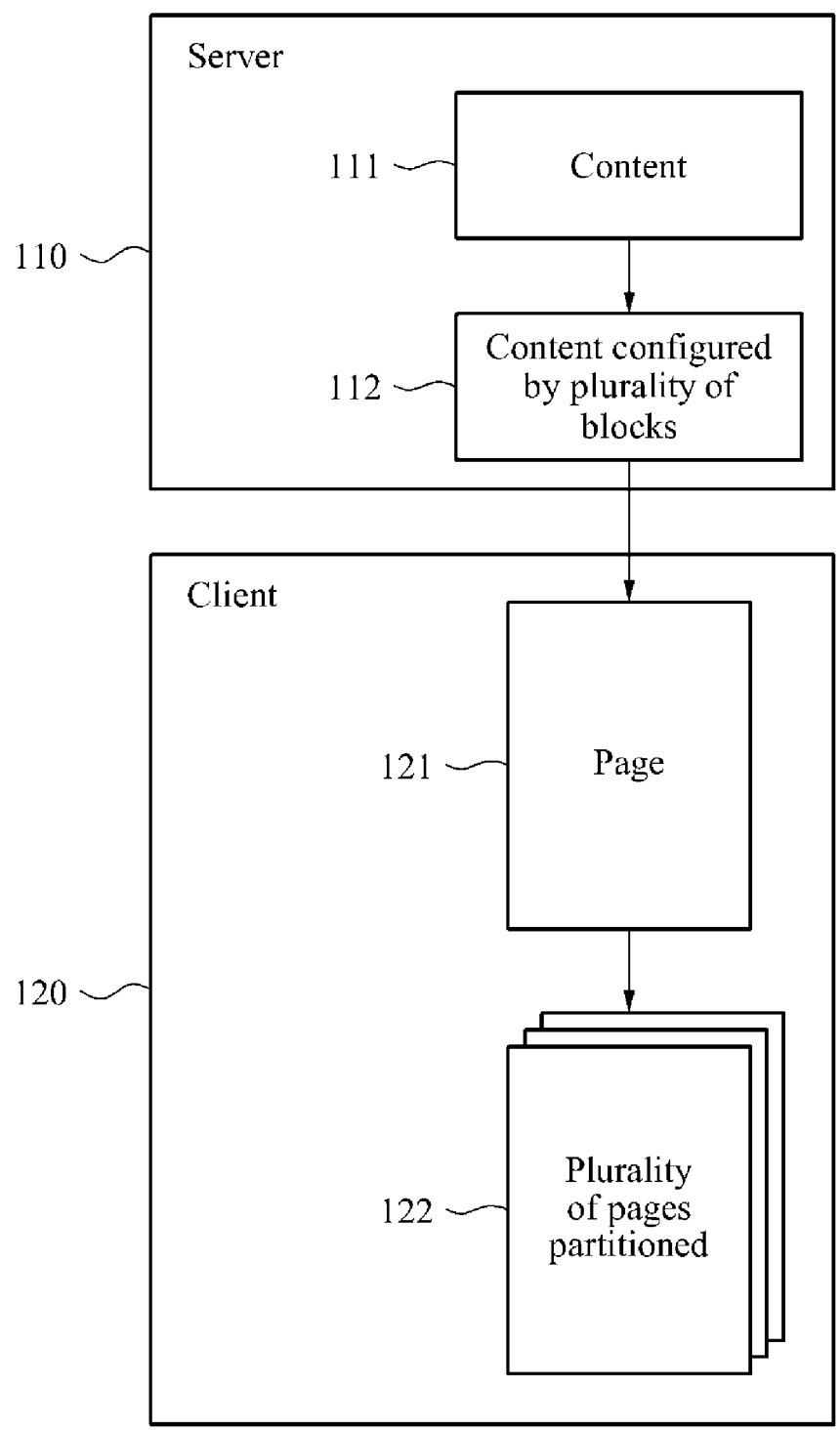
FIG. 1 is a diagram illustrating a server and a client according to exemplary embodiments of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element is referred to as being "connected to" another element, it can be directly connected to the other element, or intervening elements may be present. In contrast, when an element is referred to as being "directly on" or "directly connected to" another element or layer, there are no intervening elements or layers present. It may also be understood that for the purposes of this disclosure, "at least one of X, Y, and Z" can be construed as X only, Y only, Z only, or any combination of two or more items X, Y, and Z (e.g., XYZ, XYY, YZ, ZZ).

Hereinafter, exemplary embodiments of the present invention are described in detail with reference to the accompanying drawings.

FIG. 1 is a diagram illustrating a server 110 and a client 120.

Referring to FIG. 1, the server 110 may refer to a system for providing a web page including content 111 to the client 120 via a wired/wireless network. The client 120 may refer to a mobile device through which a web page provided by the server 110 may be displayed on a terminal screen.

The server 110 may partition the content 111 included in the web page into at least one block, and provide a page 121 including content 112, configured by the at least one block, to the client 120. The block may be a minimum unit area to be used as an element for configuring content. For example, a single hypertext markup language (HTML) element or a plurality of HTML elements may configure a single block. Partitioning content into a plurality of blocks may indicate that partitioned content included in single content may be distinguished by at least one block.

The client 120 may partition the page 121, including the content 112 configured by the at least one block, to create a plurality of partitioned pages 122, and display at least one of the plurality of partitioned pages 122.

Figure 2:
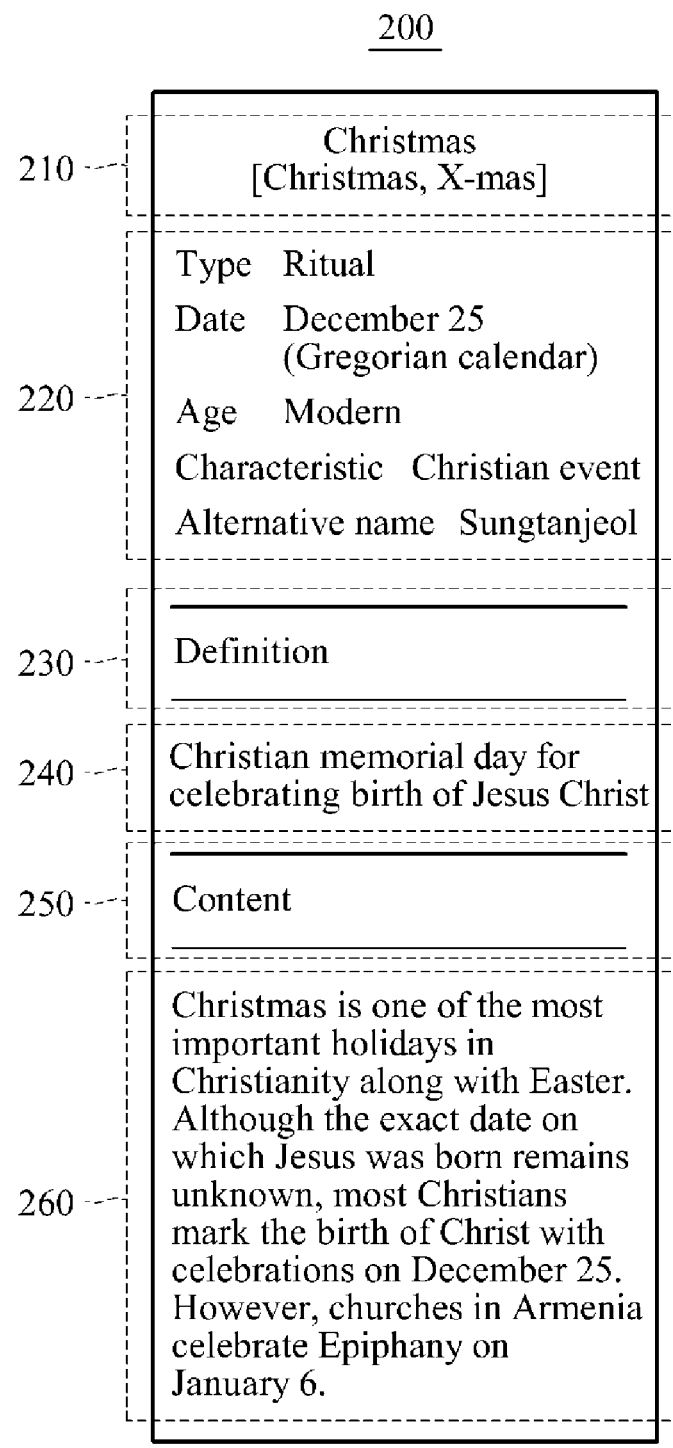
FIG. 2 is a diagram illustrating an example of content available to be included in a web page according to exemplary embodiments of the present invention.

FIG. 2 is a diagram illustrating an example of content 200 that may be available to be included in a web page. Referring to FIG. 2, the content 200 may be partitioned into six blocks, from a first block 210 to a sixth block 260.

One of the six blocks may be classified as a non-breakable block and another block may be classified as a breakable block.

When partitioned content, included in a corresponding block, is to be additionally partitioned, the non-breakable block may refer to a block determined to be unavailable for additional partitioning since the additional partitioning may be determined to result in content being visually recognized as an error, or comprehension of the content 200 being difficult.

The breakable block may refer to a block determined to be available for additional partitioning since a visual representation of the additional partitioning may be determined to be natural, and may not affect a user comprehension of the content 200 in spite of the previously partitioned content included in a corresponding block being further partitioned.

In exemplary embodiments of FIG. 2, the first block 210 to the fifth block 250 may be configured to be non-breakable blocks, and the sixth block 260 may be set to be a breakable block.

For example, when a title "Christmas" and a foreign language equivalent "[Christmas, X-mas]" are partitioned, the first block 210 may be set to be the non-breakable block due to a probability of being recognized as a service error.

In exemplary embodiments of the present invention, when a brief description of two to three lines is partitioned, the fourth block 240 may be set to be the non-breakable block since a visual representation of the partitioned content may be determined to be unnatural, and the content 200 may be better understood without partitioning.

When the content 200 is partitioned in units of lines in exemplary embodiments of the present invention, the sixth block 260 may be set to be the breakable block since a visual representation of the partitioned content is determined to be natural, and a user understanding of the content 200 may only be affected to an infinitesimal extent.

For example, the server 110 in FIG. 1 may group elements available for a partitioning from among HTML elements configuring content as a breakable block. The server 110 may group elements unavailable for a partitioning among consecutive elements as a single non-breakable block.

For example, since an element included in the sixth block 260 is determined to be available for a partitioning within the element, the server 110 may group the element as a breakable block with a priority. However, a plurality of elements included in the first block 210 to the fifth block 250 may be determined to be unavailable for a partitioning since the visual representation may be unnatural, or a probability of being recognized as a service error may exist when partitioning is performed within the plurality of elements. The server 110 may group elements that may be unavailable for partitioning among consecutive elements as a single non-breakable block. For example, elements in the second block 220 such as "type", "ritual", "date", "December 25 (Gregorian calendar)", "age", "modern", "characteristic", "Christian event", "alternative name", and "Sungtanjeol" may be grouped as a single non-breakable block since the elements are consecutive and unavailable for partitioning.

Figure 3:
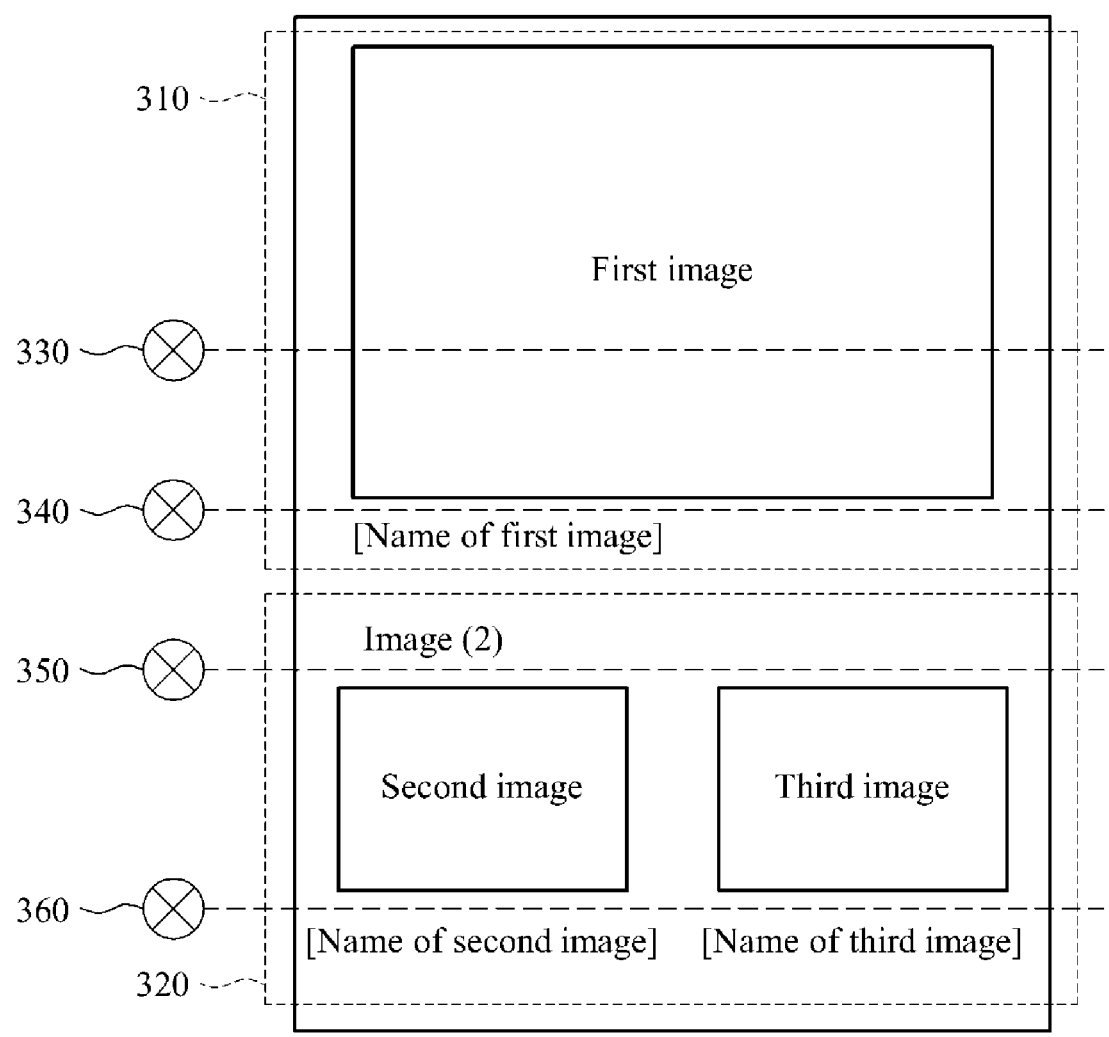
FIG. 3 is a diagram illustrating an example of content including an image according to exemplary embodiments of the present invention.

FIG. 3 is a diagram illustrating an example of content 300 including an image. Referring to FIG. 3, the content 300 may include a first image, a second image, and a third image, and a name corresponding to the images may be displayed on a lower portion of the images. The content 300 may be partitioned into two non-breakable blocks, for example, a first non-breakable block 310 and a second non-breakable block 320.

When an image of the content 300 is partitioned into two, a first marking 330 may refer to a case in which a single image may not be partitioned due to a probability of a visual representation being recognized as a service error.

When an image is partitioned from a name of the image, a second marking 340 and a fourth marking 360 may refer to a case in which the image and the name of the image may not be partitioned due to a probability of a visual representation being recognized as a service error.

When a title of an image area is partitioned from an image list, a third marking 350 may refer to a case in which the title of the image area and the image list included in the image area may not be partitioned due to a probability of a visual representation being recognized as a service error.

As described in the FIG. 2 and FIG. 3, single content included in a web page may be partitioned into at least one block based on various conditions.

Figure 6:
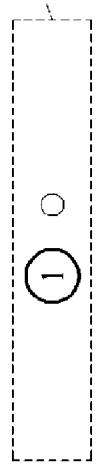

FIG. 4, FIG. 5, and FIG. 6 are diagrams illustrating screens 400 to 600 displayed by automatically partitioning a web page based on a screen size of a mobile terminal. Referring to FIG. 4, FIG. 5 and FIG. 6, the screens 400 to 600 illustrate content being configured by a plurality of blocks and displayed on a screen in mobile terminals of different screen sizes. Among the screens of different sizes, the first screen 400 may be smallest, and the third screen 600 may be the largest. The second screen 500 may be larger than the first screen 400 and smaller than the third screen 600.

Referring to FIG. 2, FIG. 4, FIG. 5, and FIG. 6, the first screen 400 illustrates an example in which a single page is configured by the first block 210 and the second block 220 of FIG. 2.

The second screen 500 illustrates an example in which a single page is configured by the first block 210 to the fourth block 240 of FIG. 2.

The third screen 600 illustrates an example in which a single page is configured by the first block 210 to the sixth block 260 of FIG. 2. Due to the sixth block 260 being a breakable block, only a partial portion of content may be included in the page. As the sixth block 260 may be the breakable block, the sixth block 260 may be additionally partitioned.

A first dotted line box 410 of the first screen 400, a second dotted line box 510 of the second screen 500, and a third dotted line box 610 of the third screen 600 may refer to user interfaces for informing a user of a web page including the content 200 of FIG. 2 being partitioned into a plurality of pages.

The user interfaces may include an interface for moving to the plurality of pages. For example, a plurality of circles displayed on the second dotted line box 510 may correspond to the plurality of partitioned pages. When the user selects, for example, touches a circle corresponding to the plurality of pages, a page corresponding to the circle may be displayed on a screen.

The first dotted line box 410 may indicate an example in which a web page including the content 200 of FIG. 2 is partitioned into three pages. The second dotted line box 510 may indicate an example in which a web page including the content 200 of FIG. 2 is partitioned into one page. The third dotted line box 530 may indicate an example in which a web page including the content 200 of FIG. 2 is partitioned into two pages.

Figure 7:
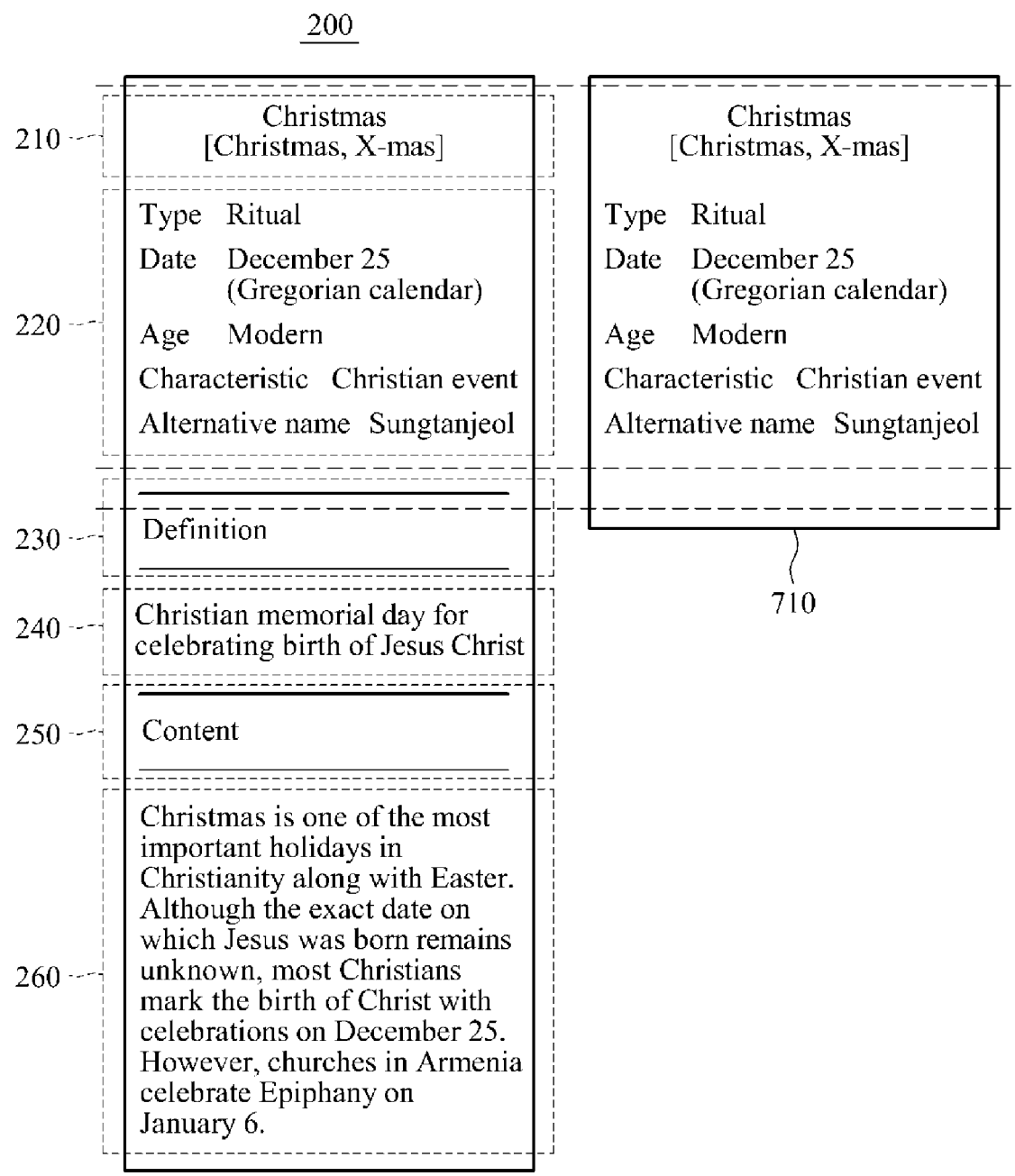
FIG. 7, FIG. 8, FIG. 9, and FIG. 10 are diagrams illustrating examples in which a web page is partitioned into a plurality of pages in a mobile terminal having a predetermined screen size according to exemplary embodiments of the present invention.
Figure 8:
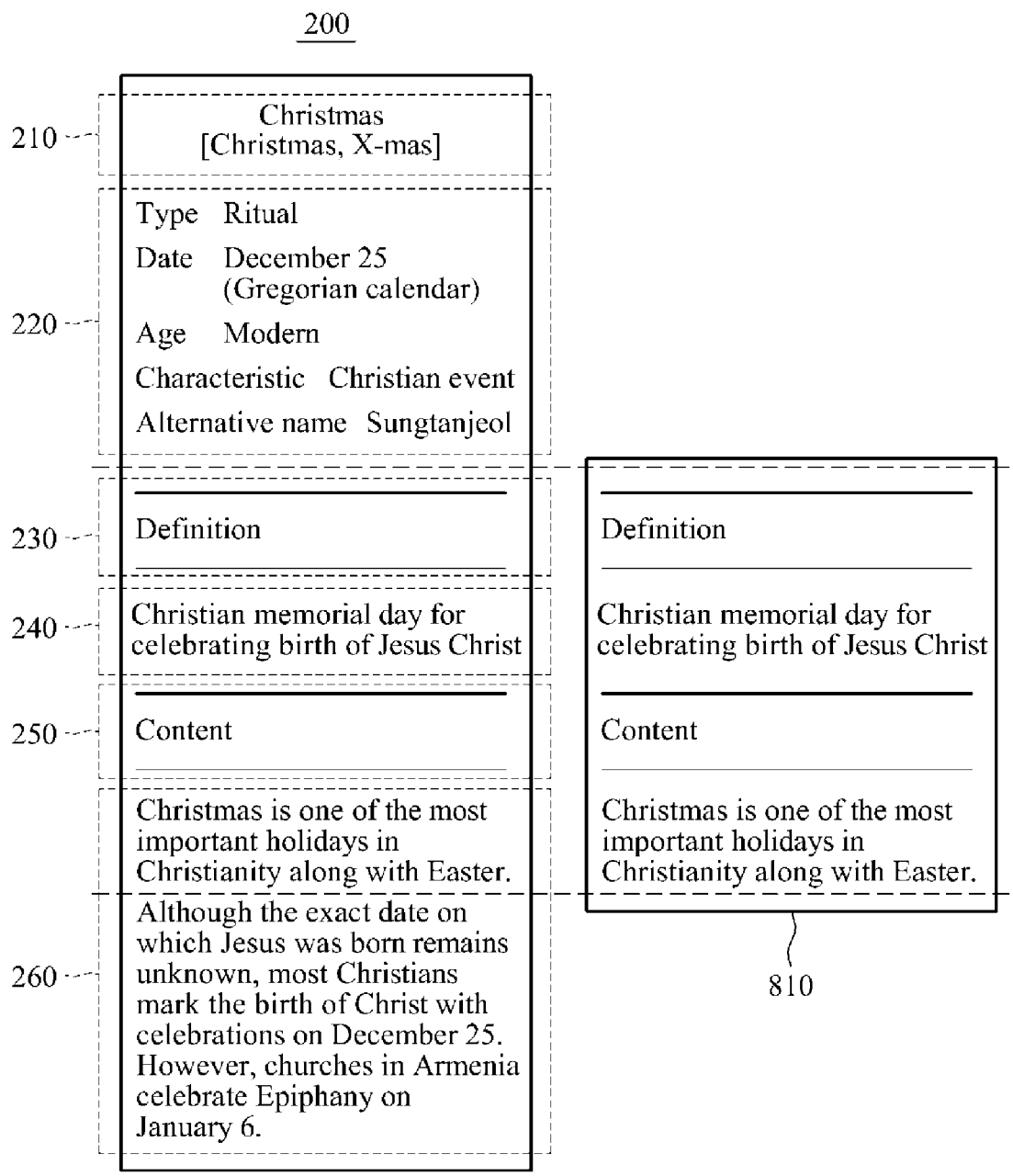
Figure 9:
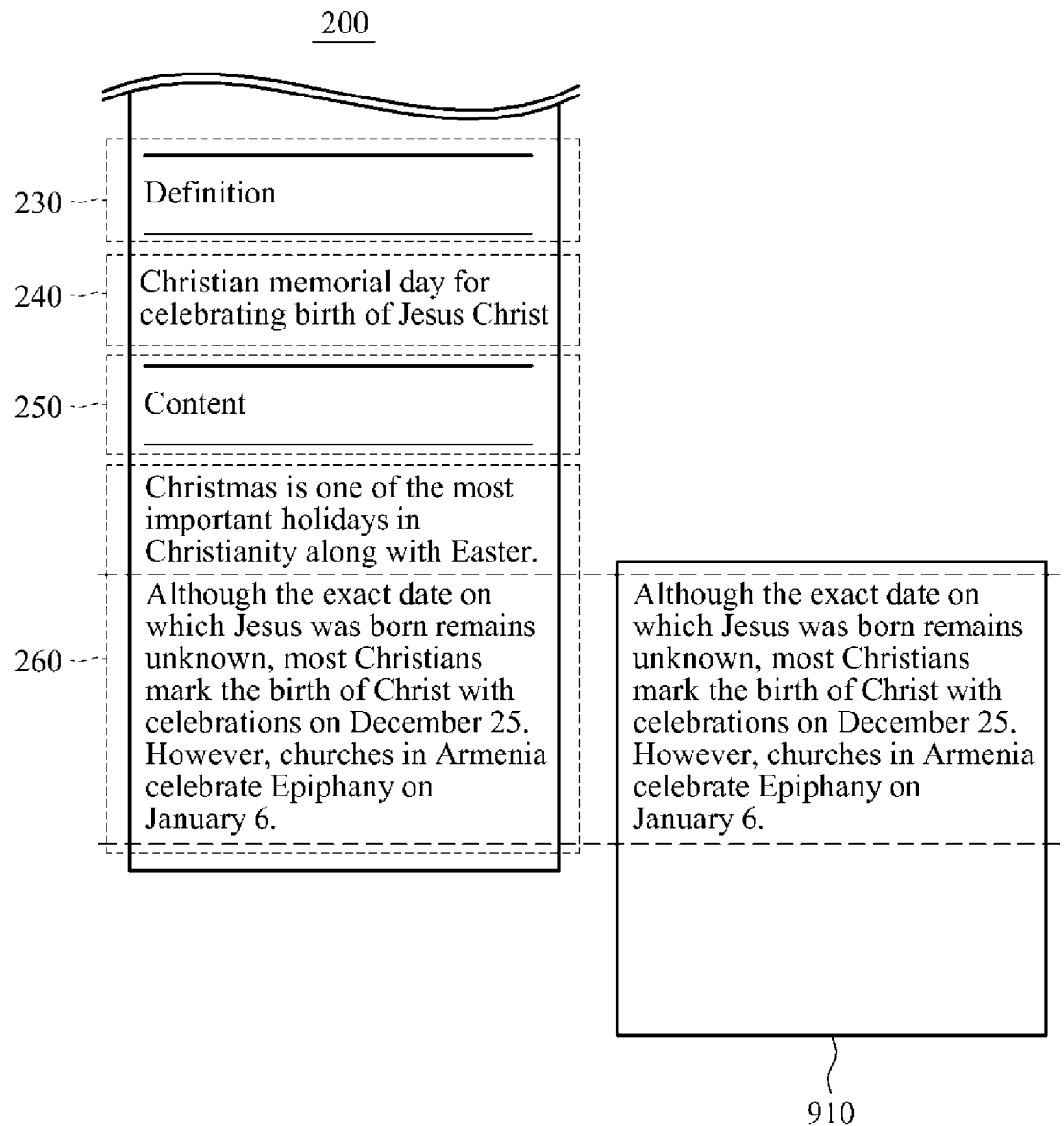

FIG. 7, FIG. 8, FIG. 9, and FIG. 10 are diagrams illustrating examples in which a web page is partitioned into a plurality of pages in a mobile terminal having a predetermined screen size. Referring to FIG. 7, FIG. 8, and FIG. 9, the content 200 of FIG. 2 may be partitioned into three pages, and the three pages may be displayed on a screen of the mobile terminal.

FIG. 7 illustrates a first page 710 including the first block 210 and the second block 220 of the content 200. The first page 710 may have space available for other partitioned content, however, the third block 230 or a portion of the third block 230 may fail to be included in the first page 710 since the third block 230 is a non-breakable block.

FIG. 8 illustrates a second page 810 including the third block 230 to the fifth block 250 and a portion of the sixth block 260 of the content 200. The sixth block 260 may be available for additional partitioning since the sixth block 260 may be a breakable block. Accordingly, a portion of the partitioned content of the sixth block 260 available for being displayed on a screen may be partitioned to be displayed on the second page 810.

FIG. 9 illustrates a third page 910 including a remainder of the partitioned content of the sixth block 260.

Figure 10:
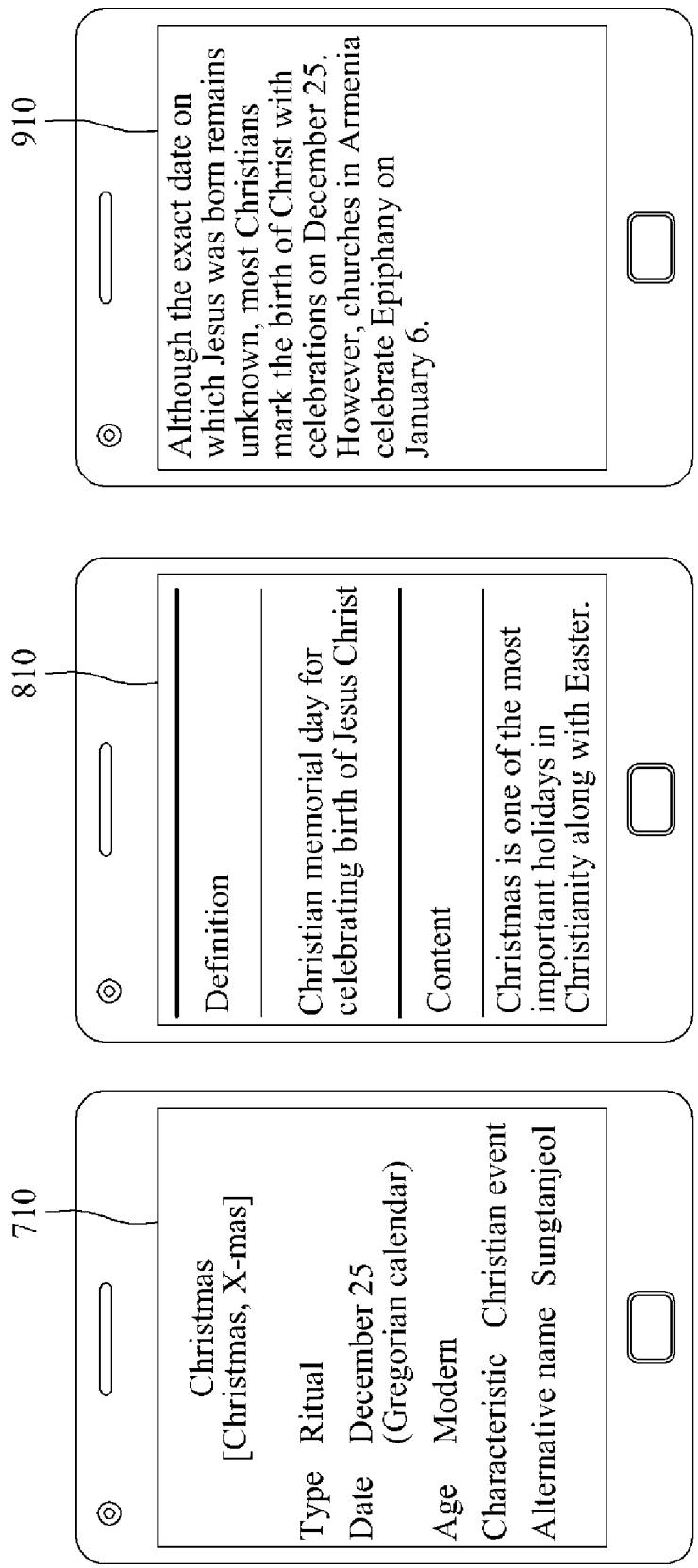

FIG. 10 illustrates an exemplary embodiment in which the first page 710, the second page 810, and the third page 910 are displayed on a mobile terminal. The mobile terminal may include a touch display, and change a page displayed on a screen to another page from among a plurality of pages partitioned as a touch gesture, such as flicking, swiping, and touching, and dragging are detected through the touch display. For example, when flicking toward a left direction is detected on the first page 710, the second page 810 may be displayed on the screen of the mobile terminal.

Figure 11:
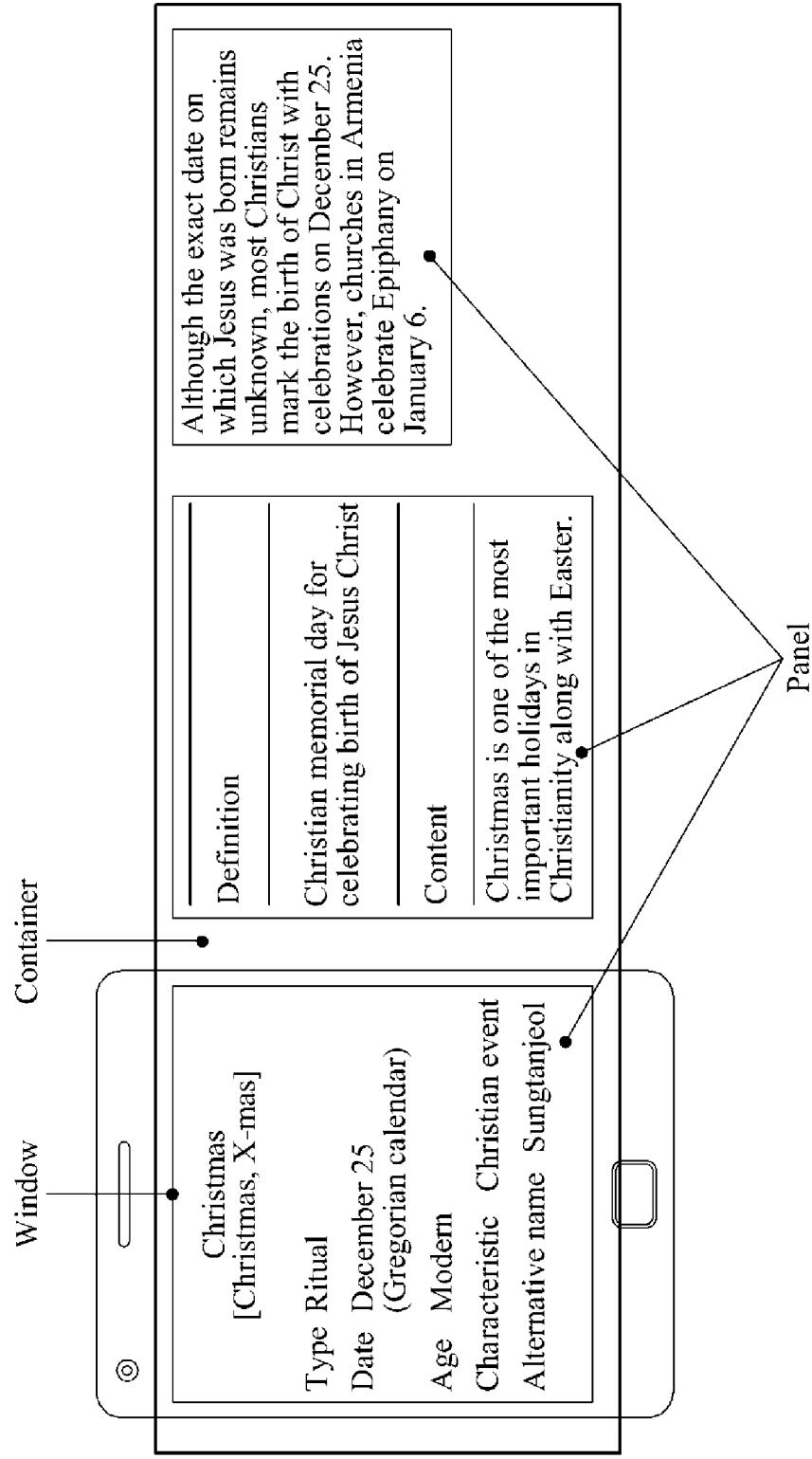
FIG. 11, FIG. 12, and FIG. 13 are diagrams illustrating an example of a screen movement between pages according to exemplary embodiments of the present invention.
Figure 12:
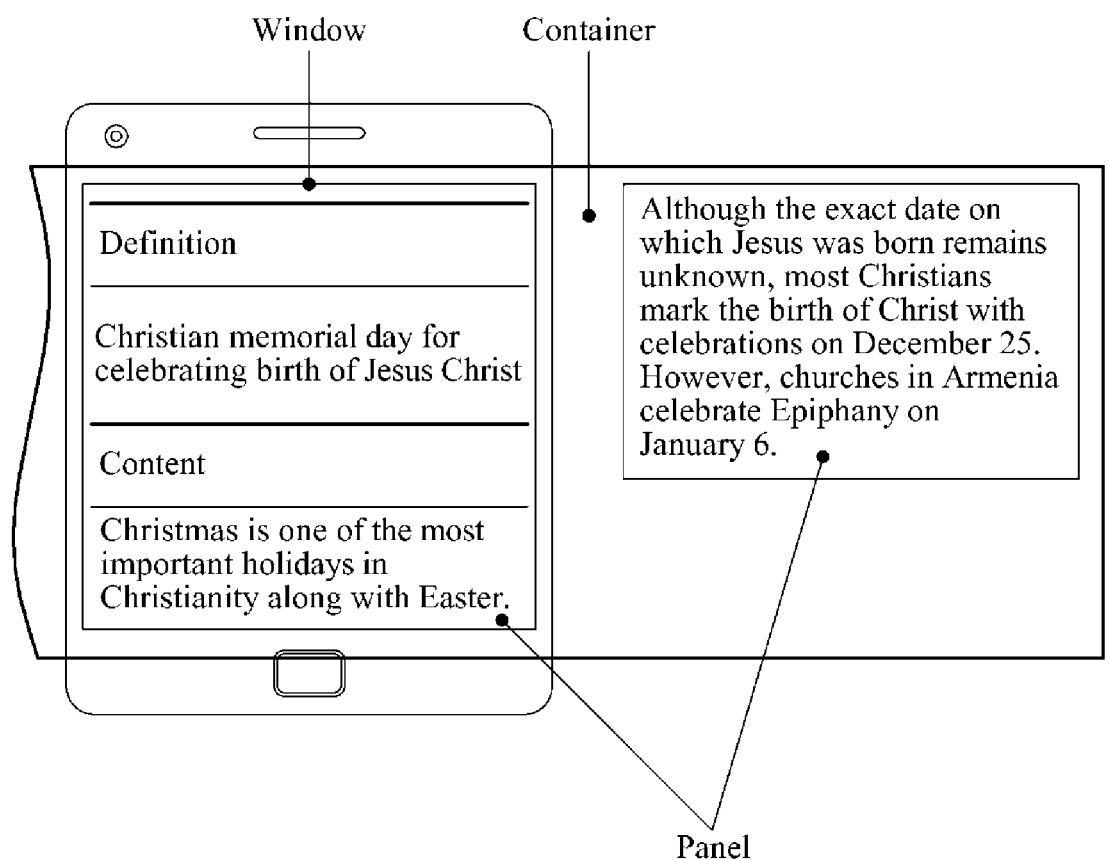
Figure 13:
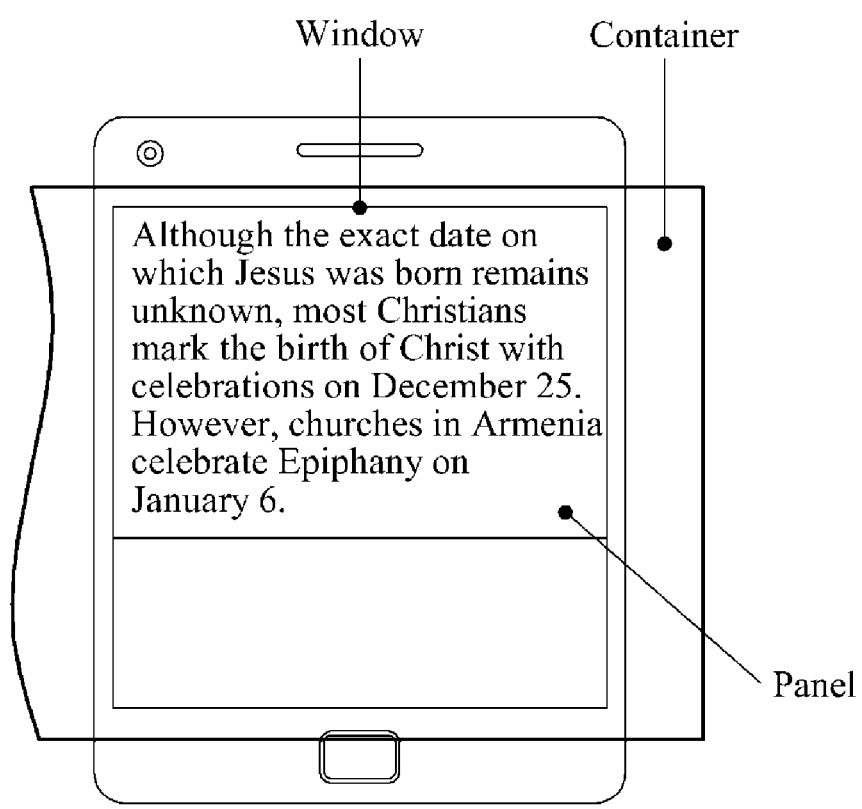

FIG. 11, FIG. 12, and FIG. 13 are diagrams illustrating an example of a screen movement between pages. Referring to FIG. 11, FIG. 12, and FIG. 13, a "window" with respect to a "panel" may be displayed on a screen of a mobile terminal, as a "container" including a plurality of "panels", may be moved by flicking action of a user. The "Panel" may correspond to a plurality of pages, and the "window" may refer to a window opened in a browser.

Table 1, Table 2, and Table 3 illustrate a portion of an HTML source code for implementing windows displayed in FIGS. 11 to 13.

TABLE 1

```
<div id="hview-window" style="width:300px; overflow-x:hidden">
    <div id="hview-container">
        <div class="hview-panel" style="float:left;
        width:100%"> ... </div>
        <div class="hview-panel" style="float:left;
        width:100%"> ... </div>
        <div class="hview-panel" style="float:left;
        width:100%"> ... </div>
    </div>
</div>
```

TABLE 2

```
<div id="hview-window" style="width:300px; overflow-x:hidden">
    <div id="hview-container" style="left:-300px">
        <div class="hview-panel" style="float:left;
        width:100%"> ... </div>
        <div class="hview-panel" style="float:left;
        width:100%"> ... </div>
        <div class="hview-panel" style="float:left;
        width:100%"> ... </div>
    </div>
</div>
```

TABLE 3

```
<div id="hview-window" style="Width:300px; overflow-x:hidden">
    <div id="hview-container" style="left:-600px">
        <div class="hview-panel" style="float:left;
        width:100%"> ... </div>
        <div class="hview-panel" style="float:left;
        width:100%"> ... </div>
        <div class="hview-panel" style="float:left;
        width:100%"> ... </div>
    </div>
</div>
```

Figure 14:
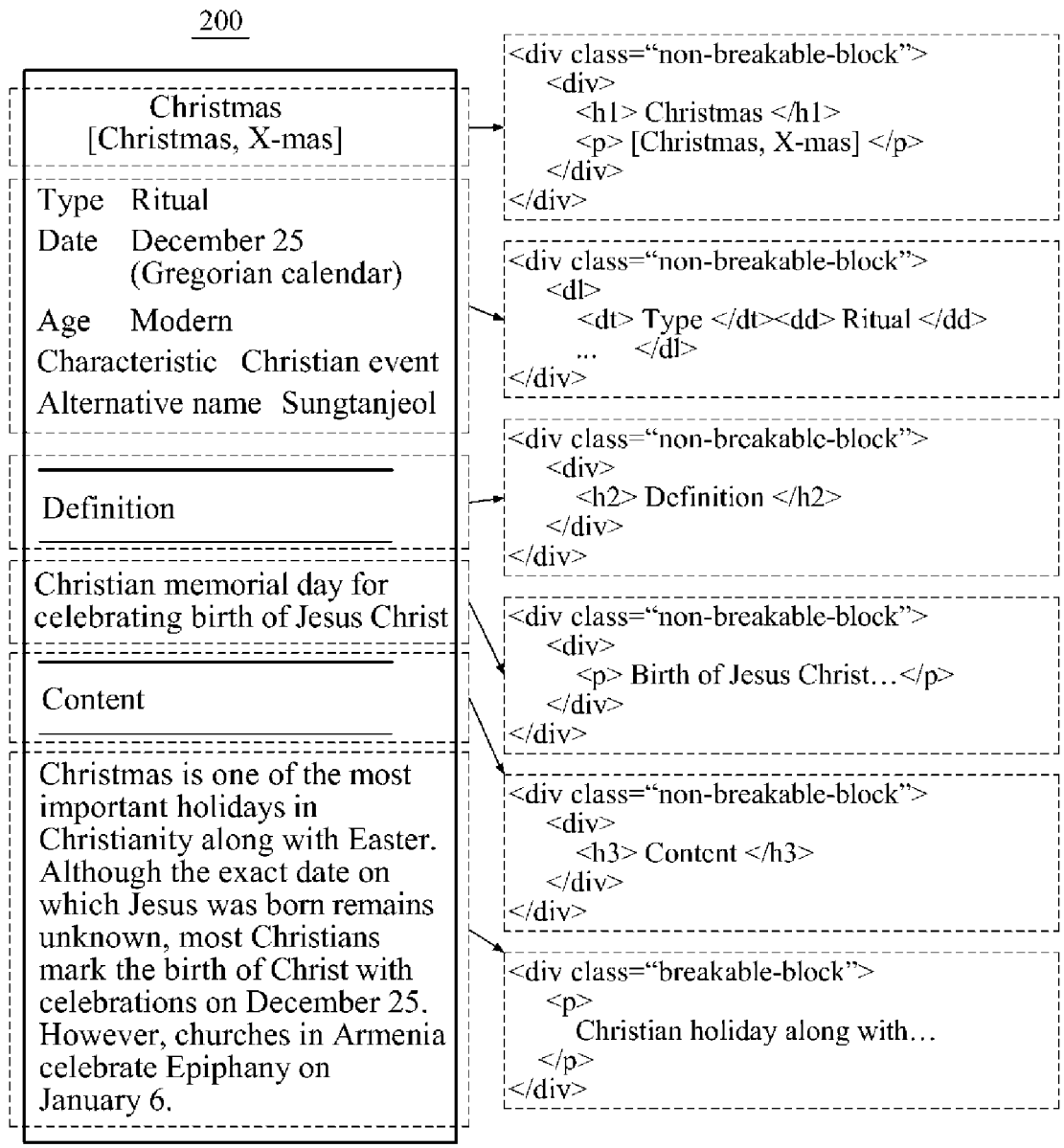
FIG. 14 is a diagram illustrating an example of a method for displaying a block on a web page according to exemplary embodiments of the present invention.

FIG. 14 is a diagram illustrating a method for displaying a block on a web page. Referring to FIG. 14, a plurality of blocks included in the content 200 in FIG. 2 may be represented in an HTML code. A code corresponding to the plurality of blocks may include information about whether a corresponding block is a non-breakable block or a breakable block.

FIG. 15, FIG. 16, FIG. 17, FIG. 18, and FIG. 19 are diagrams illustrating exemplary embodiments of performing a dynamic partitioning on a page based on a screen size of a mobile terminal 1500.

Figure 15:
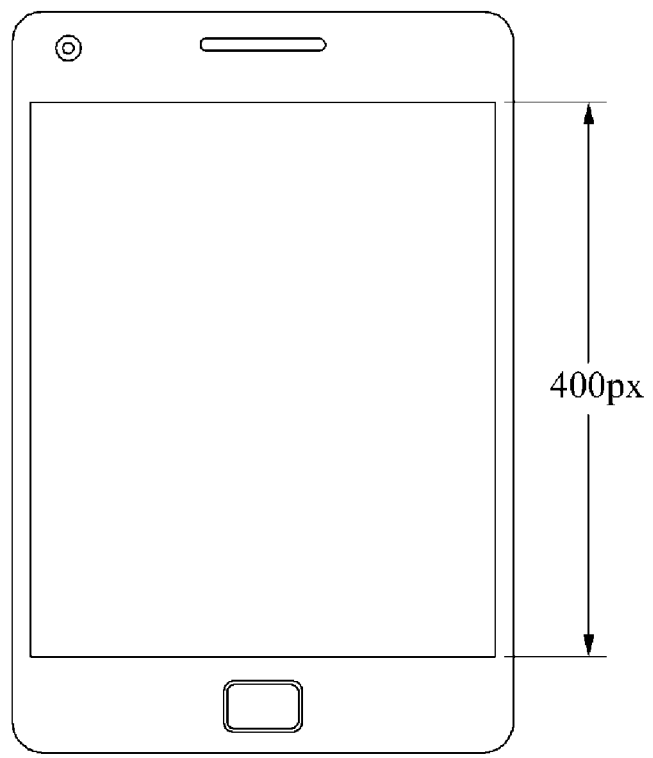
FIG. 15, FIG. 16, FIG. 17, FIG. 18, and FIG. 19 are diagrams illustrating an example of performing a dynamic partitioning on a page based on a screen size of a mobile terminal according to exemplary embodiments of the present invention.

FIG. 15 illustrates the screen size of the mobile terminal 1500 having a screen height of 400 pixels. Accordingly, a single web page may be partitioned into a plurality of pages. A height of the plurality of pages may be less than or equal to 400 pixels.

Figure 16:
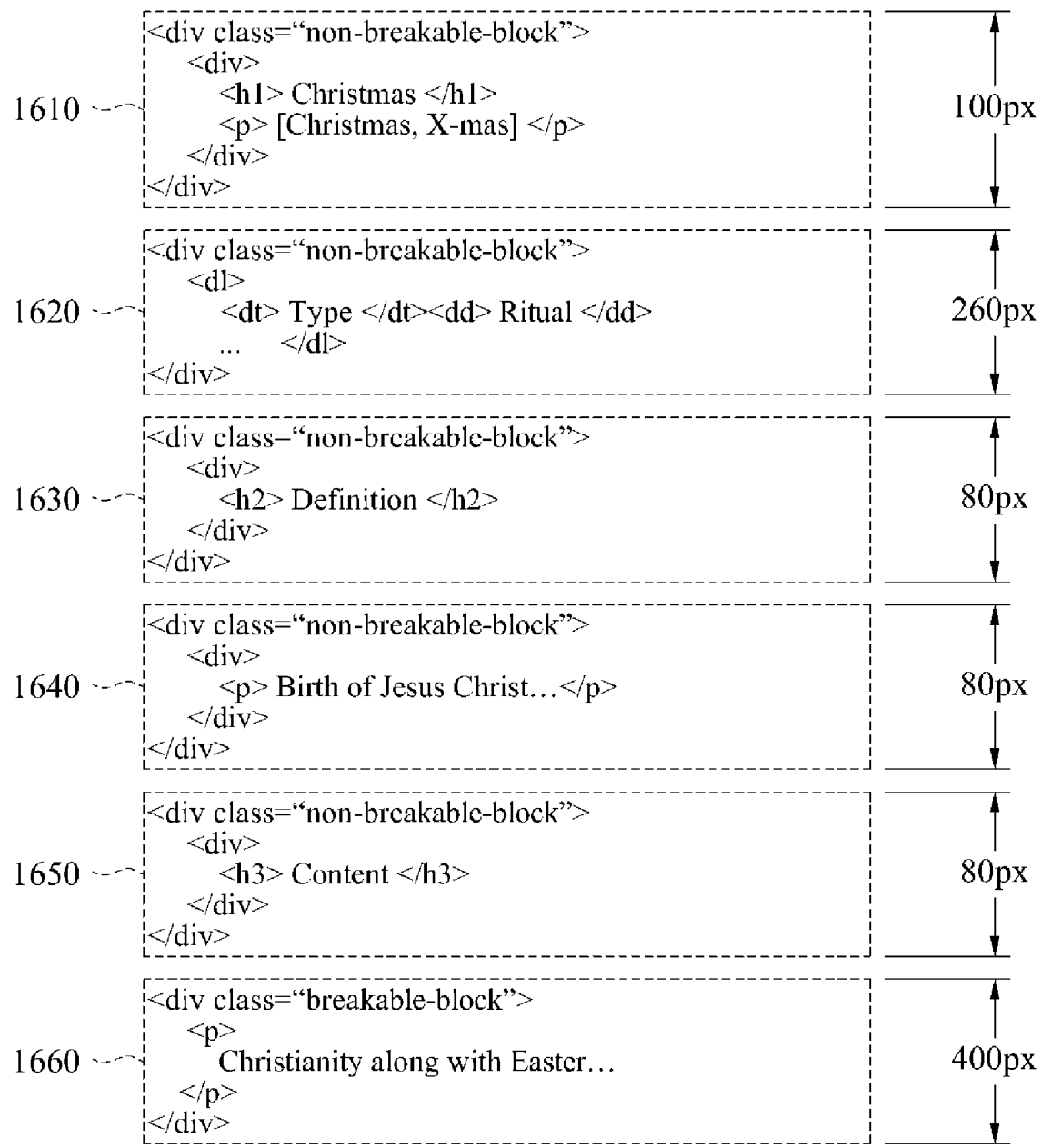

FIG. 16 illustrates a pixel value required when a plurality of blocks included in the content 200 in FIG. 2 is displayed on a screen of the mobile terminal 1500. For example, when a first block 1610 is displayed on the screen, the first block 1610 may be displayed at a height of 100 pixels on the screen.

Figure 17:
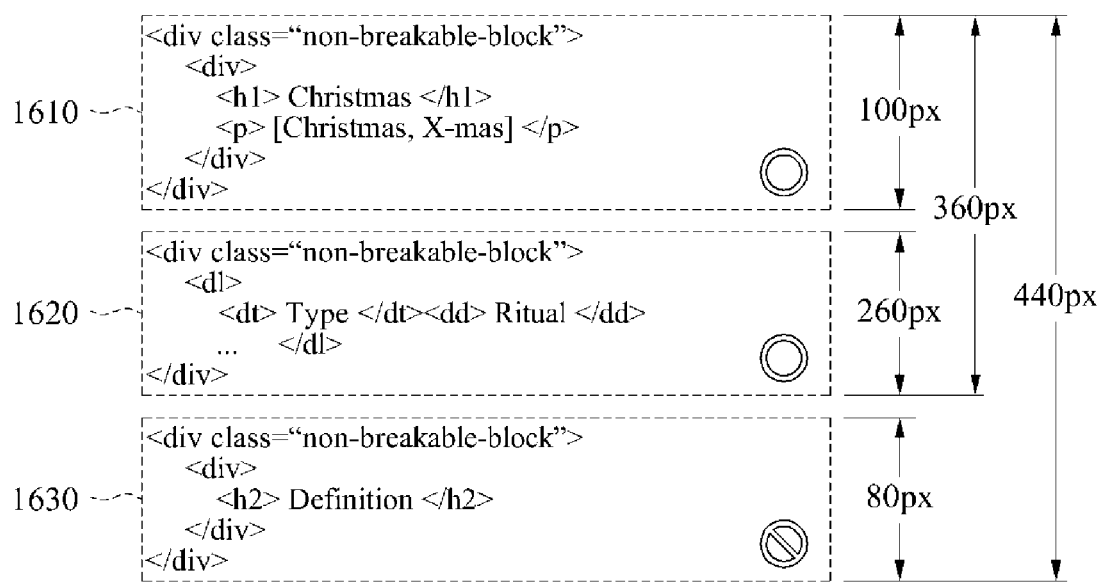

FIG. 17 illustrates a first page partitioned, including the first block 1610 and a second block 1620. The first block 1610, a second block 1620, and a third block 1630 may be non-breakable blocks, and thus additional partitioning may not be possible. The first block 1610 and the second block 1620 may be displayed at a combined height of 360 pixels while the first block 1610, the second block 1620, and the third block 1630 may be displayed at a combined height of 440 pixels. Since the screen height of the mobile terminal 1500 is 400 pixels, the first page partitioned may include the first block 1610 and the second block 1620.

Figure 18:
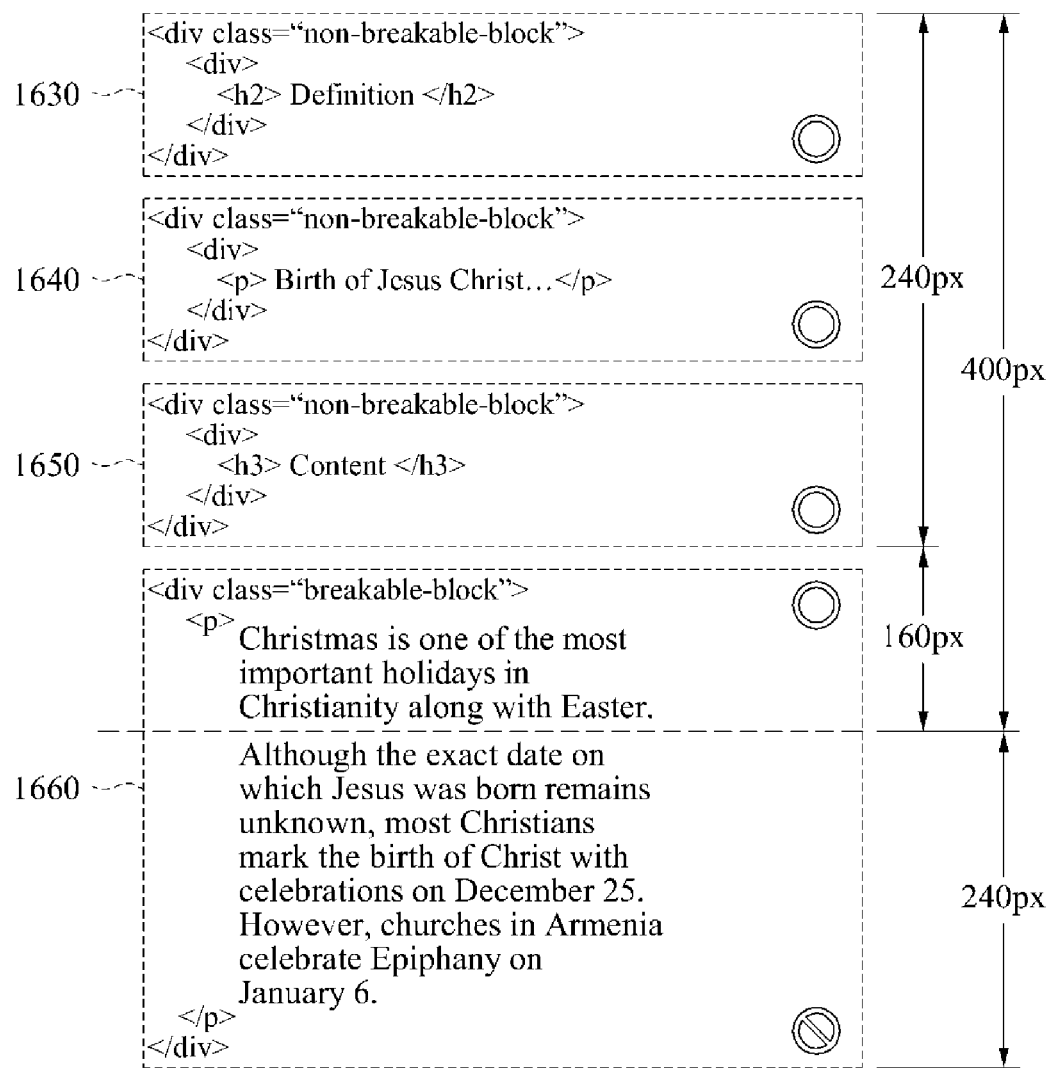

FIG. 18 illustrates a second page partitioned including the third block 1630, a fourth block 1640, a fifth block 1650, and a portion of a sixth block 1660. Since a pixel height for displaying a total of the third block 1630, the fourth block 1640, and the fifth block 1650 is 240 pixels, the third block 1630, the fourth block 1640, and the fifth block 1650 may be included in a single page. Although the sixth block 1660 may require a height of 400 pixels, the sixth block 1660 may be additionally partitioned due to being a breakable block. Accordingly, partitioned content of the sixth block 1660 at a height of 160 pixels may further be included in the second page partitioned.

Figure 19:
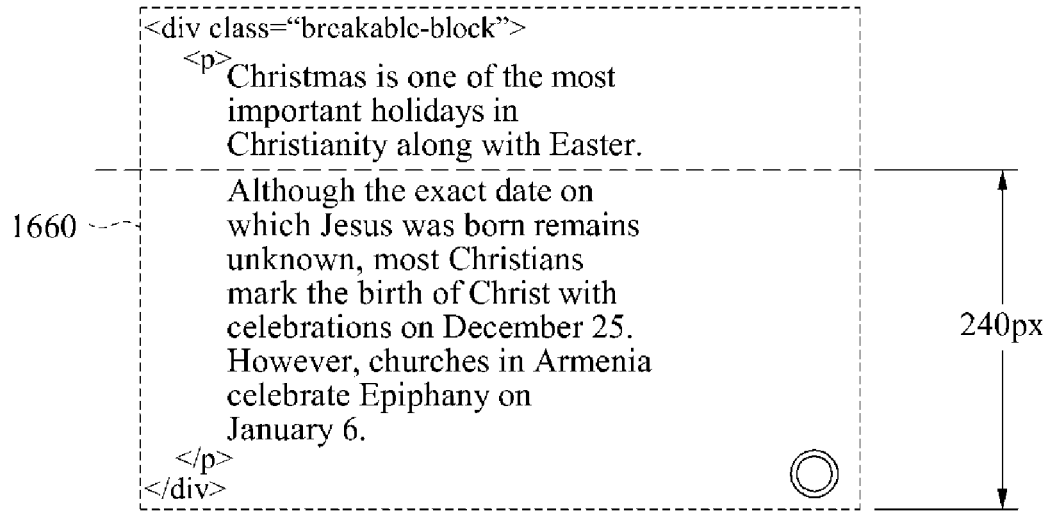

FIG. 19 illustrates a third page including a remainder of the sixth block 1660. For example, as described in FIG. 18, since the partitioned content of the sixth block 1660 at the height of 160 pixels is included in the second page, remaining partitioned content of the sixth block 1660 at a height of 240 pixels may be included in the third page.

A portion of HTML source codes for embodying the partitioned pages described in FIG. 17, FIG. 18, and FIG. 19 as windows may be represented in Table 4, Table 5, and Table 6.

TABLE 4

```
<div class="hview-panel">
    <div class="page" style="overflow-y:hidden;height:360px;margin-top:0">
        <div class="non-breakable-block">
            <div>
                <h1> Christmas </h1>
                <p> [Christmas,X-mas] </p>
            </div>
        </div>
        <div class="non-breakable-block">
            <dl>
                <dt> Field </dt><dd>Ritual </dd>
                ...
            </dl>
        </div>
    </div>
</div>
```

TABLE 5

```
<div class="hview-panel">
    <div class="page" style="overflow-y:hidden;height:400px;margin-top:0">
        <div class="non-breakable-block">
            <div>
                <h2> Definition </h2>
            </div>
        </div>
```

TABLE 5-continued

```
<div class="non-breakable-block">
    <div>
        <p> Christian memorial day for celebrating birth of Jesus
        Christ </p>
    </div>
</div>
<div class="non-breakable-block">
    <div>
        <h3>Content </h3>
    </div>
</div>
<div class="breakable-block" >
    <p>
        Christmas is one of the most important holidays in
        Christianity along with Easter. Although the exact date on
        which Jesus was born remains unknown, most Christians
        mark the birth of Christ with celebrations on December 25.
        However, churches in Armenia celebrate Epiphany on
        January 6.
    </p >
    </div>
</div>
</div>
```

TABLE 6

```
<div class="hview-panel">
    <div class="page" style="overflow-y:hidden;height:240px;margin-
    top:-160">
        <div class="top-of-page" style="position:absolute;top:0;-
        height:20px">
            <div class="breakable-block">
                <p>
                Christmas is one of the most important holidays in
                Christianity along with Easter. Although the exact date on
                which Jesus was born remains unknown, most Christians
                mark the birth of Christ with celebrations on December 25.
                However, churches in Armenia celebrate Epiphany on
                January 6.
                </p>
            </div>
        </div>
    </div>
</div>
```

Figure 20:
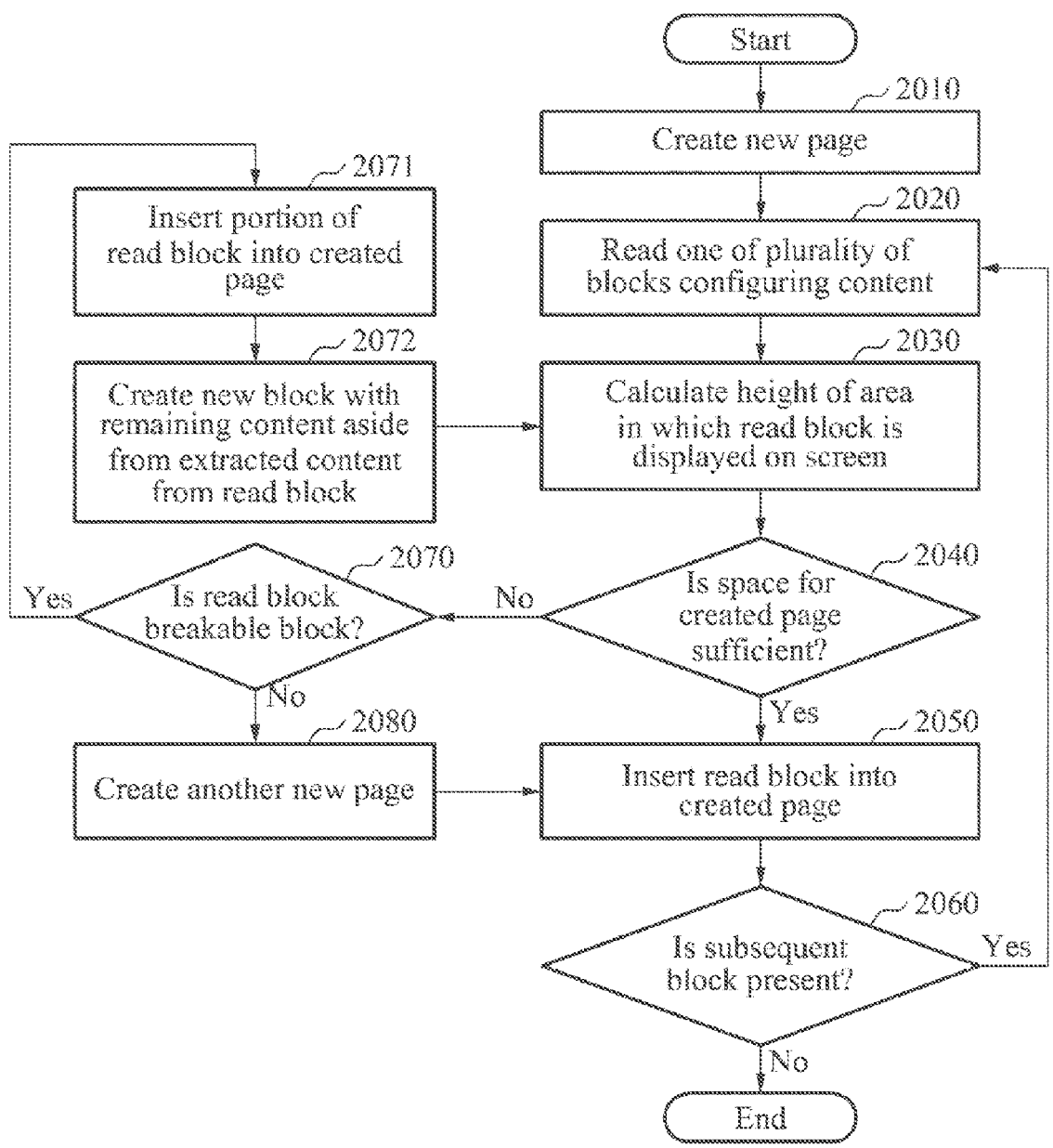
FIG. 20 is a flowchart illustrating an example of a process of partitioning a web page into a plurality of pages using content configured by a plurality of blocks according to exemplary embodiments of the present invention.

FIG. 20 is a flowchart illustrating a method for partitioning a page that partitions a web page into a plurality of pages using content configured by a plurality of blocks. The method for partitioning the page may be performed by the client 120 of FIG. 1 upon or after receiving the content configured by a plurality of blocks.

In operation 2010, the client 120 may create a new page.

In operation 2020, the client 120 may read one of a plurality of blocks configuring the content.

In operation 2030, the client 120 may calculate a height of an area in which the read block is displayed on a screen. The height of the area may be provided in a form of a number of pixels required for displaying partitioned content of content corresponding to the read block.

In operation 2040, the client 120 may determine a space for the created page and may also determine whether the space created for the page is sufficient. When the space of the created page is determined to be sufficient, operation 2050 may be performed, and when the space of the created page is determined to be insufficient, operation 2070 may be performed. The client 120 may determine whether the space for the created page is sufficient by comparing a height A of the created page, for example, a screen height, and the height B of the area in which the read block may be displayed on the screen. When another block is inserted into the created page, whether the space for the created page is sufficient may be determined by comparing a value obtained by subtracting a height C of the area in which the other block is displayed on the screen from A and B. For example, when (A−C) is greater than B, the client 120 may determine the space for the created page is sufficient.

In operation 2050, the client 120 may insert the read block into the created page.

In operation 2060, the client 120 may determine whether a subsequent block is present, and when the subsequent block is determined to be present, the method for partitioning the page may be performed by repeating the process starting at operation 2020. When the subsequent block is determined not to be absent, performing of the method for partitioning the page may be completed.

In operation 2070, the client 120 may determine whether the read block is a breakable block. When the read block is determined to be the breakable block, operation 2071 may be performed, and when the read block is determined to be a non-breakable block, operation 2080 may be performed.

In operation 2071, the client 120 may insert a portion of the read block into the created page. For example, the client 120 may extract a portion to be included, corresponding to a remaining area of the created page from the read block, and insert the extracted portion into the created page. For example, when a height of an area in which the read block is displayed on a screen is 300 pixels, and a height of the remaining area of the created page is 150 pixels, the client 120 may extract partitioned content corresponding to a height of 150 pixels from the read block, and insert the extracted partitioned content into the remaining area of the created page.

In operation 2072, the client 120 may create a new block with a remaining partitioned content that was not included in the extracted partitioned content from the read block. The client 120 may perform the method for partitioning the page by repeating from operation 2030 using the new block.

In operation 2080, the client 120 may create another new page. When the other new page is created, the client 120 may perform the method for partitioning the page by repeating the process starting at operation 2050.

FIG. 20 illustrates a method for partitioning a web page into a plurality of pages performed by the client 120. The method for partitioning the web page into the plurality of pages may also be performed in the server 110. For example, when the client 120 requests a web page from the server 110, the client 120 may provide information about a screen size, and/or a screen height, to the server 110. The server 110 may partition the web page into a plurality of pages based on the information, and provide the plurality of pages partitioned to the client 120.

Figure 21:
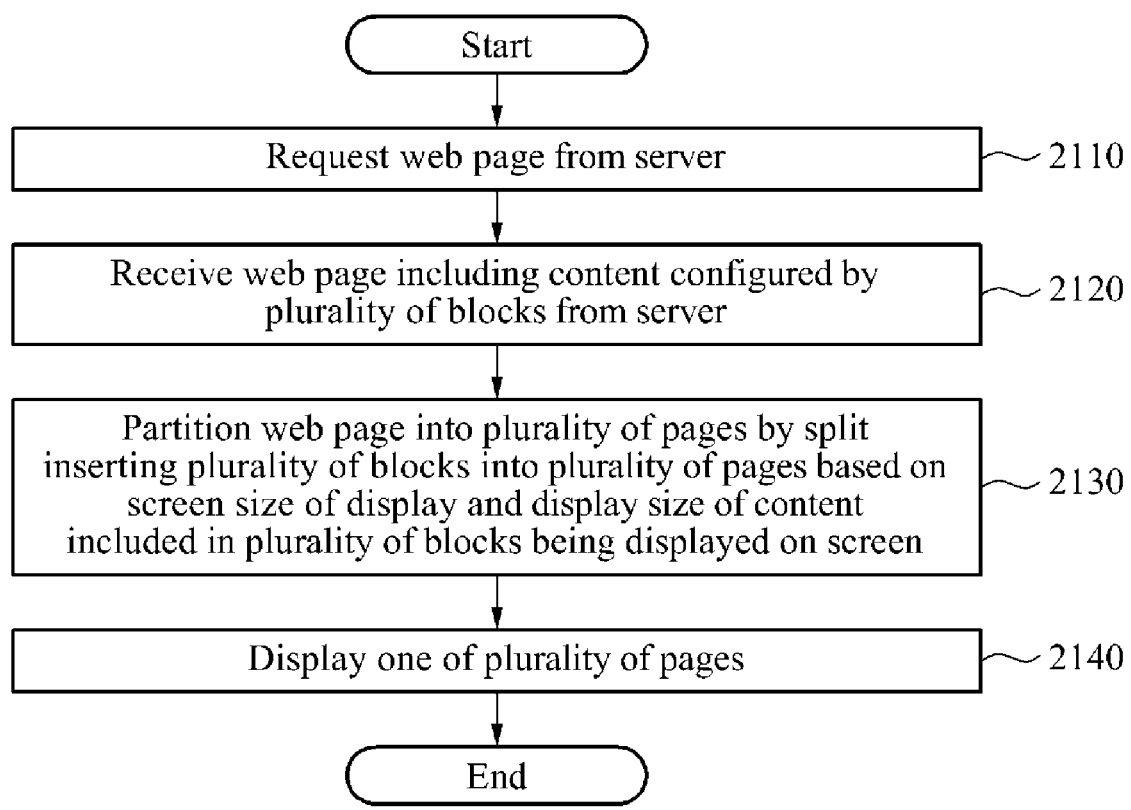
FIG. 21 is a flowchart illustrating a first example of a method for providing a web page according to exemplary embodiments of the present invention.

FIG. 21 is a flowchart illustrating exemplary embodiments of a method for providing a web page. The method for providing the web page may be performed by the client 120 in FIG. 1.

In operation 2110, the client 120 may request a web page from a server.

In operation 2120, the client 120 may receive the web page including content configured by a plurality of blocks from the server. The plurality of blocks may be set to be one of breakable blocks available for additional partitioning and one of non-breakable blocks not available for additional partitioning.

In operation 2130, the client 120 may partition the web page into a plurality of pages, by split inserting the plurality of blocks into the plurality of pages, based on a screen size of a display and a display size of partitioned content included in the plurality of blocks displayed on a screen. The screen size may include a value of a height in pixels of the display or may include a height of the plurality of pages, and the display size may include a value of a height in pixels required for displaying the partitioned content on the screen.

The non-breakable block may be included in another page among the plurality of pages when the display size of the non-breakable block is determined to exceed a remaining area of one page of the plurality of pages, based on the display size and a size of the remaining area.

The breakable block may be additionally partitioned, such that a portion of the breakable block is included in the one page of the plurality of pages, and a remainder of the breakable block may be included in another page when the breakable block is determined to exceed the remaining area.

For example, operation 2130 may include reading one of a plurality of blocks configuring content, and calculating (not shown) a size of an area in which the read block is displayed on a screen. A determining (not shown) may be made on whether the read block may be included in the area based on the calculated size and a size of a remaining area of a first page of the plurality of pages. A portion of the read block may be extracted based on the calculated size and the size of the area when the read block is determined to exceed the area, and is a breakable block available for additional partitioning. The extracted portion may be inserted (not shown) into the first page. At least a portion of a remainder of the read block remaining, aside from the extracted portion, may be inserted into a second page from among the plurality of pages.

In operation 2140, the client 120 may display one of the plurality of pages on the screen.

A display may include a touch display. The method for providing the web page may further include displaying a single page displayed on the screen by changing the single page to another page in response to a touch gesture detected from the touch display.

Figure 22:
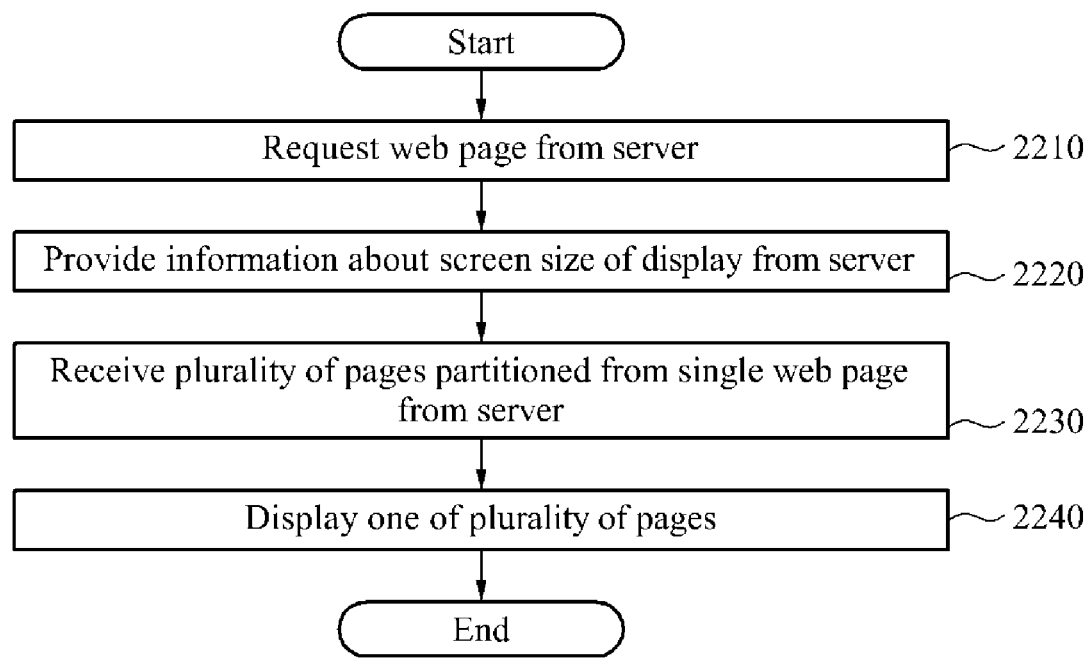
FIG. 22 is a flowchart illustrating a second example of a method for providing a web page according to exemplary embodiments of the present invention.

FIG. 22 is a flowchart illustrating exemplary embodiments of a method for providing a web page being partitioned into a plurality of pages in a server. The method may be performed by a client provided with a plurality of pages from a server.

In operation 2210, the client may request the web page from the server.

In operation 2220, the client may provide information about a screen size of a display to the server. For example, the screen size may include a value, in pixels, of a height of the display or the plurality of pages.

In operation 2230, the client may receive a plurality of pages partitioned from a single web page from the server.

Content included in the single web page may be configured by a plurality of blocks.

The plurality of blocks may be split inserted into the plurality of pages based on the screen size, and a display size of partitioned content included in the plurality of blocks being displayed on the screen. The display size may include a value, in pixels, of height required for displaying the partitioned content on the screen.

The plurality of blocks may be set to be one of breakable blocks available for additional partitioning and one of non-breakable blocks not available for additional partitioning.

In operation 2240, the client may display one of the plurality of pages on the screen.

Figure 23:
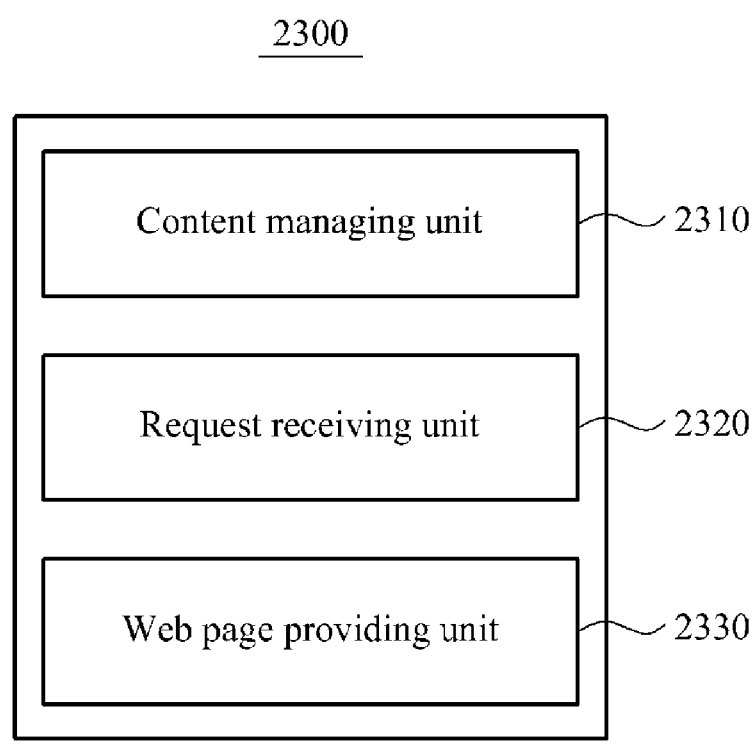
FIG. 23 is a block diagram illustrating an example of an inner configuration of a system for providing a web page according to exemplary embodiments of the present invention.
Figure 24:
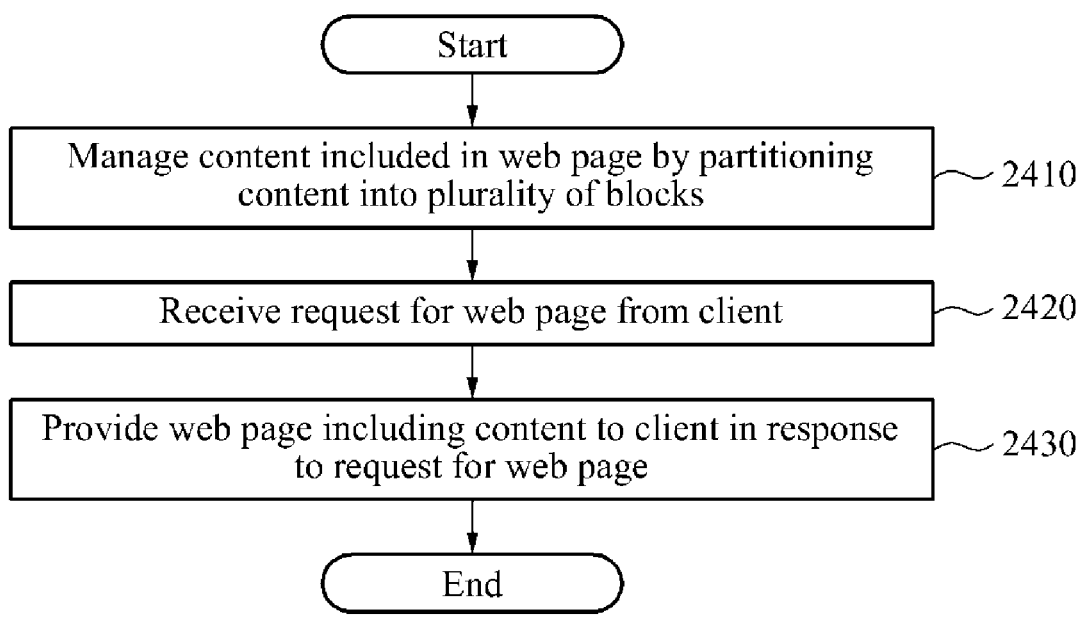
FIG. 24 is a flowchart illustrating a third example of a method for providing a web page according to exemplary embodiments of the present invention.

FIG. 23 is a block diagram illustrating an example of an inner configuration of a system 2300 for providing a web page. FIG. 24 is a flowchart illustrating a third example of a method for providing a web page. The system for providing the web page 2300 may correspond to the server 110 of FIG. 1, and as described in FIG. 23, may include a content managing unit 2310, a request receiving unit 2320, and a web page providing unit 2330. The content managing unit 2310, the request receiving unit 2320, and the web page providing unit 2330 may be implemented using computer code that is stored on one or more storage devices and executable by one or more processor. The method for providing the web page may be performed by the system for providing the web page.

In operation 2410, the system 2300 for providing the web page or the content managing unit 2310 may manage content included in the web page by partitioning the content into a plurality of blocks. As described, the plurality of blocks may be set to be one of breakable blocks available for additional partitioning and one of non-breakable blocks not available for additional partitioning. It is envisioned that in some cases, the system 2300 may provide a non-breakable block that exceeds a screen size of the client. According to an exemplary embodiment of the present invention, when an unbreakable block exceeds the screen size of the client, the client may recognize this situation and nevertheless partition the non-breakable block into a plurality of pages. Further, in this case, when the first page is displayed, the client device may also display a note indicating that the display of the page may not be optimum. For example, the note may state that "The page is too large to display on one screen. Thus, the content's appearance may not be optimal."

In operation 2420, the system 2300 for providing the web page or the request receiving unit 2320 may receive a request for a web page from a client. The client may correspond to the client 120 of FIG. 1 and FIG. 21.

In operation 2430, the system 2300 for providing the web page or the web page providing unit 2330 may provide the web page including the content to the client in response to the request for the web page. The web page may be partitioned into the plurality of pages by split inserting the plurality of blocks, into the plurality of pages, based on a screen size of a display, and a display size of partitioned content included in the plurality of blocks being displayed on the screen.

Figure 25:
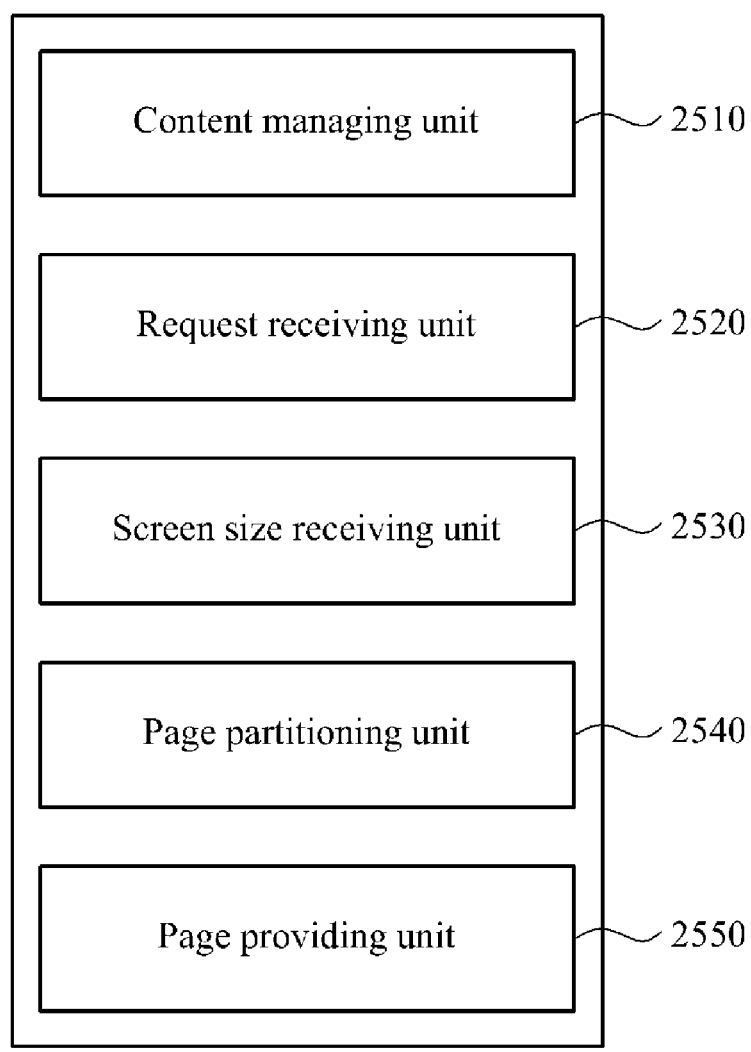
FIG. 25 is a block diagram illustrating another example of an inner configuration of a system for providing a web page according to exemplary embodiments of the present invention.
Figure 26:
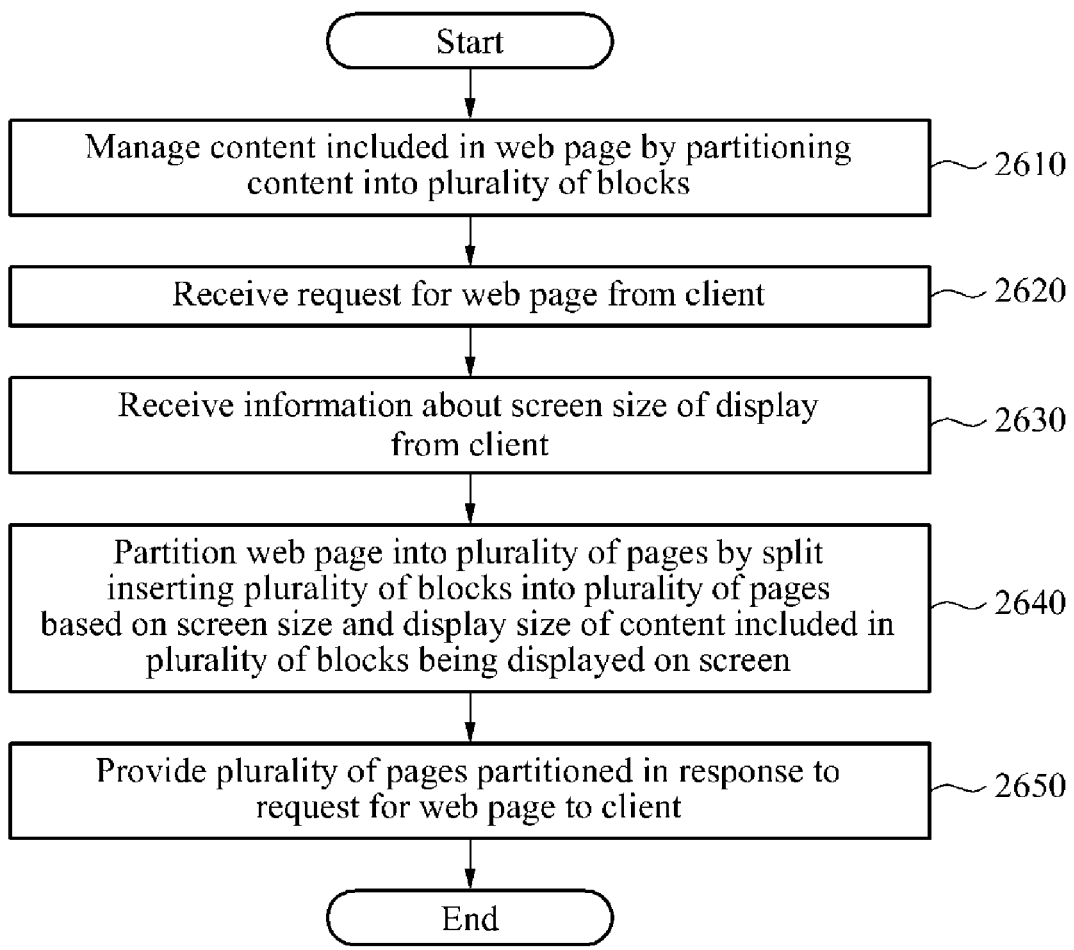
FIG. 26 is a flowchart illustrating a fourth example of a method for providing a web page according to exemplary embodiments of the present invention.

FIG. 25 is a block diagram illustrating exemplary embodiments of an inner configuration of a system 2500 for providing a web page. FIG. 26 is a flowchart illustrating another exemplary embodiment of a method for providing a web page. The system 2500 for providing the web page may correspond to a server that receives information about a screen size from a client and partitions a web page, into a plurality of pages, to provide the partitioned plurality of pages to the client. The system 2500 for providing the web page may include a content managing unit 2510, a request receiving unit 2520, a screen size receiving unit 2530, a page partitioning unit 2540, and a page providing unit 2550. The content managing unit 2510, request receiving unit 2520, screen size receiving unit 2530, page partitioning unit 2540, and page providing unit 2550 may be implemented using computer code that is stored on one or more storage devices and executable by one or more processors. The method for providing the web page may be performed by the system 2500 for providing the web page.

In operation 2610, the system 2500 for providing the web page or the content managing unit 2510 may manage content included in the web page by partitioning the content into a plurality of blocks.

In operation 2620, the system 2500 for providing the web page or the request receiving unit 2520 may receive a request for a web page from a client. The client may correspond to the client of FIG. 22.

In operation 2630, the system 2500 for providing the web page or the screen size receiving unit 2530 may receive information about a screen size of a display from the client.

In operation 2640, the system 2500 for providing the web page or the page partitioning unit 2540 may partition the web page, into the plurality of pages, by split inserting the plurality of blocks into the plurality of pages based on the screen size and a display size of partitioned content included in the plurality of blocks being displayed on the screen.

In operation 2650, the system 2500 for providing the web page or the page providing unit 2550 may provide the plurality of pages partitioned to the client in response to the request for the web page.

For any descriptions omitted in FIG. 21, FIG. 22, FIG. 23, FIG. 24, FIG. 25, and FIG. 26, reference may be made to FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, and FIG. 20.

According to exemplary embodiments of the present invention, it is possible to overcome a limited screen size of a mobile terminal, enhance readability of a web page, and enhance usability by performing a dynamic partitioning on the web page based on a type of the mobile terminal or a screen size.

The exemplary embodiments according to the present invention may be recorded in computer-readable media including program instructions to implement various operations executed by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM discs and DVD; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using a processor. The described hardware devices may be configured to execute software modules in order to perform the operations of the above-described embodiments of the present invention. The described hardware devices may be configured to act as one or more software modules in order to perform the operations of the above-described exemplary embodiments of the present invention. For example, it should be understood that the server 110, the content 200, and the screens 400, 500, and 600 may include a storage unit, a processor, an input unit, and an output unit to execute the exemplary embodiments described herein.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for displaying a web page using a display screen, the method comprising:
   configuring content for a web page into a plurality of blocks;
   determining that the plurality of blocks includes a breakable block available for additional partitioning and a non-breakable block unavailable for additional partitioning based on the non-breakable block having an image Hypertext Markup Language (HTML) element and a title HTML element,
   determining a probability that any additional partitioning renders a visual representation of the non-breakable block being recognized as a service error based on separating the image HTML element from the title HTML element;
   receiving a web page comprising content configured by the plurality of blocks from a server;
   partitioning, by a client computing device, the web page into a plurality of pages by splitting and inserting the plurality of blocks into the plurality of pages based on a screen size of the display screen, and a display size of the content in the plurality of blocks to be displayed on the display screen; and
   displaying a page of the plurality of pages on the display screen, wherein the partitioning of the web page into the plurality of pages comprises:
   calculating a size of an area in which a read block is to be displayed on the display screen by reading one of the plurality of blocks comprising the content;
   determining, based on the calculated size and a size of an area remaining on a first page of the plurality of pages, whether the read block is able to be included in the area;
   in response to the read block not being able to be included in the area remaining on the first page, and the read block being a breakable block for additional partitioning, extracting at least a portion of the read block based on the calculated size and the size of the area remaining on the first page, inserting the extracted portion into the first page, and inserting at least a portion of a remainder of the read block other than the extracted portion into a second page of the plurality of pages; and
   in response to the read block not being able to be included in the area remaining on the first page, and the read block being a non-breakable block for unavailable for additional partitioning, inserting the read block into the second page, wherein when the non-breakable block exceeds the screen size of the display screen, partitioning the non-breakable block into plurality of pages.

2. The method of claim 1, wherein a subset of the plurality of blocks includes one or more markings to indicate to the client computing device that the subset includes one or more non-breakable blocks.

3. The method of claim 1, further comprising displaying a single page on the display screen by changing the single page in response to a touch, wherein the display screen comprises a touch display screen.

4. The method of claim 1, wherein the screen size comprises a value, in pixels, at which a height of the display or a height of the plurality of pages is displayed, and
   wherein the display size comprises the value, in pixels, of a height required for displaying the partitioned content on the display.

5. A method for displaying a web page using a display screen, the method comprising:
   providing information on a screen size of a display screen to the server;
   receiving a plurality of pages partitioned from a single web page from the server; and displaying a page of the plurality of pages partitioned on the display screen, wherein content included in the single web page is configured by a plurality of blocks, determining that the plurality of blocks includes a breakable block available for additional partitioning and a non-breakable block unavailable for additional partitioning based on the non-breakable block having an image Hypertext Markup Language (HTML) element and a title HTML element, determining a probability that any additional partitioning renders a visual representation of the non-breakable block being recognized as a service error based on separating the image HTML element from the title HTML element, and partitioning the web page into a plurality of pages wherein the plurality of blocks is split and inserted into the plurality of pages based on the screen size and a display size of the content in the plurality of blocks displayed on the display screen;

wherein the partitioning of the web page into the plurality of pages comprises:

calculating a size of an area in which a read block is to be displayed on the display screen by reading one of the plurality of blocks comprising the content;

determining, based on the calculated size and a size of an area remaining on a first page of the plurality of pages, whether the read block is able to be included in the area;

in response to the read block not being able to be included in the area remaining on the first page, and the read block being a breakable block for additional partitioning, extracting at least a portion of the read block based on the calculated size and the size of the area remaining on the first page, inserting the extracted portion into the first page, and inserting at least a portion of a remainder of the read block other than the extracted portion into a second page of the plurality of pages; and in response to the read block not being able to be included in the area remaining on the first page, and the read block being a non-breakable block for unavailable for additional partitioning, inserting the read block into the second page, wherein when the non-breakable block exceeds the screen size of the display screen, partitioning the non-breakable block into plurality of pages.

6. The method of claim 5, wherein a subset of the plurality of blocks includes one or more markings to indicate to the client computing device that the subset includes one or more non-breakable blocks.

7. The method of claim 5, further comprising displaying a single page on the display screen by changing the single page in response to a touch, the display screen comprising a touch display screen.

8. A method for displaying a web page using a display screen, the method comprising:

executing content of a web page by partitioning the content into a plurality of blocks, determining that the plurality of blocks includes a breakable block available for additional partitioning and a non-breakable block unavailable for additional partitioning based on the non-breakable block having an image Hypertext Markup Language (HTML) element and a title HTML element, determining a probability that any additional partitioning renders a visual representation of the non-breakable block being recognized as a service error based on separating the image HTML element from the title HTML element;

receiving a request for the web page; and providing the web page comprising the content in response to a request for the web page, wherein the web page is partitioned into the plurality of pages by the plurality of blocks being split and inserted into the plurality of pages based on a screen size of the display screen and a display size of the content in the plurality of blocks to be displayed on the display screen;

wherein the partitioning of the web page into the plurality of pages comprises:

calculating a size of an area in which a read block is to be displayed on the display screen by reading one of the plurality of blocks comprising the content;

determining, based on the calculated size and a size of an area remaining on a first page of the plurality of pages, whether the read block is able to be included in the area;

in response to the read block not being able to be included in the area remaining on the first page, and the read block being a breakable block for additional partitioning, extracting at least a portion of the read block based on the calculated size and the size of the area remaining on the first page, inserting the extracted portion into the first page, and inserting at least a portion of a remainder of the read block other than the extracted portion into a second page of the plurality of pages; and in response to the read block not being able to be included in the area remaining on the first page, and the read block being a non-breakable block for unavailable for additional partitioning, inserting the read block into the second page, wherein when the non-breakable block exceeds the screen size of the display screen, partitioning the non-breakable block into plurality of pages.

9. The method of claim 8, wherein a subset of the plurality of blocks includes one or more markings to indicate to the client computing device that the subset includes one or more non-breakable blocks.

10. A method for displaying a web page using a display screen, the method comprising:

executing content of the web page by partitioning the content into a plurality of blocks;

determining that the plurality of blocks includes a breakable block available for additional partitioning and a non-breakable block unavailable for additional partitioning based on the non-breakable block having an image Hypertext Markup Language (HTML) element and a title HTML element, determining a probability that any additional partitioning renders a visual representation of the non-breakable block being recognized as a service error based on separating the image HTML element from the title HTML element;

receiving a request for the web page;

receiving information about a screen size of a display screen;

partitioning the web page into a plurality of pages by splitting and inserting the plurality of blocks into the plurality of pages based on the screen size and a display size of the content in the plurality of blocks to be displayed on the display screen; and providing the partitioned plurality of pages in response to the request received for the web page;

wherein the partitioning of the web page into the plurality of pages comprises:

calculating a size of an area in which a read block is to be displayed on the display screen by reading one of the plurality of blocks comprising the content;

determining, based on the calculated size and a size of an area remaining on a first page of the plurality of pages, whether the read block is able to be included in the area;

in response to the read block not being able to be included in the area remaining on the first page, and the read block being a breakable block for additional partitioning, extracting at least a portion of the read block based on the calculated size and the size of the area remaining on the first page, inserting the extracted portion into the first page, and inserting at least a portion of a remainder of the read block other than the extracted portion into a second page of the plurality of pages; and in response to the read block not being able to be included in the area remaining on the first page, and the read block being a non-breakable block for unavailable for additional partitioning, inserting the read block into the second page, wherein when the non-breakable block exceeds the screen size of the display screen, partitioning the non-breakable block into plurality of pages.

11. A non-transitory computer-readable recording medium storing a program to implement the method, the method comprising:

receiving a web page comprising content configured by a plurality of blocks from a server;

determining that the plurality of blocks includes a breakable block available for additional partitioning and a non-breakable block unavailable for additional partitioning based on the non-breakable block having an image Hypertext Markup Language (HTML) element and a title HTML element, determining a probability that any additional partitioning renders a visual representation of the non-breakable block being recognized as a service error based on separating the image HTML element from the title HTML element;

partitioning the web page into a plurality of pages by splitting and inserting the plurality of blocks into the plurality of pages based on a screen size of a display screen and a display size of the content in the plurality of blocks to be displayed on the display screen; and displaying a page of the plurality of pages on the display screen;

wherein the partitioning of the web page into the plurality of pages comprises:

calculating a size of an area in which a read block is to be displayed on the display screen by reading one of the plurality of blocks comprising the content;

determining, based on the calculated size and a size of an area remaining on a first page of the plurality of pages, whether the read block is able to be included in the area;

in response to the read block not being able to be included in the area remaining on the first page, and the read block being a breakable block for additional partitioning, extracting at least a portion of the read block based on the calculated size and the size of the area remaining on the first page, inserting the extracted portion into the first page, and inserting at least a portion of a remainder of the read block other than the extracted portion into a second page of the plurality of pages; and in response to the read block not being able to be included in the area remaining on the first page, and the read block being a non-breakable block for unavailable for additional partitioning, inserting the read block into the second page, wherein when the non-breakable block exceeds the screen size of the display screen, partitioning the non-breakable block into plurality of pages.

12. A system for displaying a web page using a display screen, the system comprising:

a processor having a plurality of functional units for performing a plurality of corresponding functions, the functional units including:

a content executing unit to execute content in a web page by partitioning the content into a plurality of blocks, the plurality of blocks including a breakable block available for additional partitioning and a non-breakable block unavailable for additional partitioning based on the non-breakable block having an image Hypertext Markup Language (HTML) element and a title HTML element, determining a probability that any additional partitioning renders a visual representation of the non-breakable block being recognized as a service error based on separating the image HTML element from the title HTML element;

a web page request receiving unit to receive a request; and a web page providing unit to provide the web page comprising the content in response to the request for the web page, wherein the web page is partitioned into a plurality of pages through the plurality of blocks being split and inserted into the plurality of pages based on a screen size of the display and a display size of the content in the plurality of blocks to be displayed on the display screen;

wherein the partitioning of the web page into the plurality of pages comprises:

calculating a size of an area in which a read block is to be displayed on the display screen by reading one of the plurality of blocks comprising the content;

determining, based on the calculated size and a size of an area remaining on a first page of the plurality of pages, whether the read block is able to be included in the area;

in response to the read block not being able to be included in the area remaining on the first page, and the read block being a breakable block for additional partitioning, extracting at least a portion of the read block based on the calculated size and the size of the area remaining on the first page, inserting the extracted portion into the first page, and inserting at least a portion of a remainder of the read block other than the extracted portion into a second page of the plurality of pages; and in response to the read block not being able to be included in the area remaining on the first page, and the read block being a non-breakable block for unavailable for additional partitioning, inserting the read block into the second page, wherein when the non-breakable block exceeds the screen size of the display screen, partitioning the non-breakable block into plurality of pages.

13. A system for displaying a web page using a display screen, the system comprising:

a processor having a plurality of functional units for performing a plurality of corresponding functions, the functional units including:

a content executing unit to execute content in the web page by partitioning the content into a plurality of blocks, the plurality of blocks comprising a breakable block available for additional partitioning and a non-breakable block unavailable for additional partitioning based on the non-breakable block having an image Hypertext Markup Language (HTML) element and a title HTML element,
determining a probability that any additional partitioning renders a visual representation of the non-breakable block being recognized as a service error based on separating the image HTML element from the title HTML element;
a web page request receiving unit to receive a request;
a screen size receiving unit to receive information about a screen size of a display screen; and
a page partitioning unit to partition the web page into a plurality of pages by splitting and inserting the plurality of blocks into the plurality of pages based on the screen size and a display size of the content in the plurality of blocks being displayed on the display screen;
wherein the partitioning of the web page into the plurality of pages performed by the page partitioning unit comprises:
calculating a size of an area in which a read block is to be displayed on the display screen by reading one of the plurality of blocks comprising the content;
determining, based on the calculated size and a size of an area remaining on a first page of the plurality of pages, whether the read block is able to be included in the area;
in response to the read block not being able to be included in the area remaining on the first page, and the read block being a breakable block for additional partitioning, extracting at least a portion of the read block based on the calculated size and the size of the area remaining on the first page, inserting the extracted portion into the first page, and inserting at least a portion of a remainder of the read block other than the extracted portion into a second page of the plurality of pages; and
in response to the read block not being able to be included in the area remaining on the first page, and the read block being a non-breakable block for unavailable for additional partitioning, inserting the read block into the second page, wherein when the non-breakable block exceeds the screen size of the display screen, partitioning the non-breakable block into plurality of pages.

* * * * *